US008401274B2

(12) United States Patent
Hazeyama et al.

(10) Patent No.: US 8,401,274 B2
(45) Date of Patent: Mar. 19, 2013

(54) IMAGE PROCESSING APPARATUS AND METHOD

(75) Inventors: Hiroyuki Hazeyama, Settsu (JP); Yuki Taniyasu, Fukuchiyama (JP); Shiro Fujieda, Kyoto (JP)

(73) Assignee: Omron Corporation, Kyoto (JP)

( * ) Notice: Subject to any disclaimer, the term of this patent is extended or adjusted under 35 U.S.C. 154(b) by 498 days.

(21) Appl. No.: 12/712,480

(22) Filed: Feb. 25, 2010

(65) Prior Publication Data

US 2010/0239124 A1 Sep. 23, 2010

(30) Foreign Application Priority Data

Mar. 13, 2009 (JP) ................ P2009-060888

(51) Int. Cl.
*G06K 9/00* (2006.01)
(52) U.S. Cl. ........................ 382/147; 382/145
(58) Field of Classification Search .......... 382/141–152, 382/162–165; 356/625–637; 702/127, 149–158
See application file for complete search history.

(56) References Cited

U.S. PATENT DOCUMENTS

2009/0059242 A1 3/2009 Fujieda et al.
2010/0021050 A1* 1/2010 Kakuda et al. ................ 382/150

FOREIGN PATENT DOCUMENTS

JP 2008-015706 A 1/2008

OTHER PUBLICATIONS

European Patent Office extended European search report on Application No. 10154016.9 dated Jun. 30, 2010; 12 pages.
Guerra, E., et al., A Three-dimensional Automated Visual Inspection System for SMT Assembly; 2001; pp. 175-190; Computers and Industrial Engineering 40 (2001).
Kusano, Akita, et al.; 3D Inspection of Electronic Devices by Means of Stereo Method on Single Camera Environment, 2008 IEEE; pp. 3391-3396.

* cited by examiner

*Primary Examiner* — Tri T Ton
(74) *Attorney, Agent, or Firm* — Foley & Lardner LLP

(57) ABSTRACT

A computer displays an image of an object which has been created by photographing by a photographing portion in a setting mode. Further, height threshold-value data is received according to an input from outside through a key board. Based on height information detected from the image created by photographing and based on the received threshold-value data, a partial image having height information specified by the threshold-value data is extracted from the image created by photographing and then is displayed. In a driving mode, the computer displays an image acquired by photographing the object, and extracts a partial image having height information specified by the threshold-value data, based on the height information detected from the image created by photographing and the threshold-value data preliminarily-received in the setting mode. The image data extracted in the driving mode is utilized for inspections of defects in the object.

13 Claims, 24 Drawing Sheets

CAMERA INPUTTED IMAGE

SUPER-DEEP IMAGE

DISTANCE IMAGE

IMAGE PROCESSING APPARATUS AND METHOD

This application is based on Japanese Patent Application No. 2009-060888 filed with the Japan Patent Office on Mar. 13, 2009, the entire content of which is hereby incorporated by reference.

BACKGROUND OF THE INVENTION

1. Technical Field

The present invention relates to an image processing apparatus and method which identify and extract an area having preliminarily-set height information from acquired images.

2. Related Art

In manufacturing scenes, automatization has been advanced, in view of power saving and higher efficiency. In order to realize the automatization, a number of sensors have been employed. Among such sensors, there have been frequently employed image sensors capable of photographing works (target objects to be inspected) and processing the images resulted from the photographing, in order to perform inspections of defects in these works.

Many image sensors are constituted by a photographing portion for photographing works and an image processing portion for processing the images resulted from photographing and are adapted to perform determination as to whether or not the images resulted from photographing include an area having a predetermined shape, and the like. As work detect inspections using such image processing, there are inspections for defects in works placed on pallets. Conventionally, works have been stopped at the same position in the field of view of a camera as a photographing portion, during transferring the works on a manufacture line. In order to detect work images from images resulted from the photographing, a measurement area is provided at a predetermined position in the field of view, and the size of the measurement area is set to be coincident with the size of works. The positional deviations of works in the images resulted from the photographing are corrected such that they are coincident with the measurement area and, thereafter, an inspection processing is started. The correction of their positional deviations is attained by applying searching and edge processing to the images resulted from the photographing.

As other methods for detecting work images from images created by photographing, there has been suggested processing for cutting backgrounds using color information. As an example of this processing, the present applicant has suggested a technique described in Japanese Unexamined Patent Publication No. 2008-15706. This technique is capable of extracting only work images (cutting backgrounds) from images created by photographing, using color information about works.

SUMMARY

With the detection of work images using the aforementioned measurement area, if there exists, on a pallet, a background (such as a shock absorption member) similar to works, even by using searching and edge processing, it is impossible to accurately perform search measurement and edge position measurement due to the influence of the background. This increases the difficulty of detecting the amount of positional deviation, thereby making it impossible to accurately correct the positional deviation. As a result, it is necessary to take longer time for work defect inspections and, also, it is hard to provide high detection accuracy.

Further, with the detection of work images according to the background cutting processing using the aforementioned color information, it is hard to perform processing for cutting only backgrounds, in cases where backgrounds and works have the same color. Further, due to the use of color information, the detection tends to be influenced by external environments such as the condition of illumination.

Therefore, it is an object of the present invention to provide an image processing apparatus and method which are capable of detecting images of objects from images created by photographing, without being subjected to restrains on the placement of target objects to be detected and the color of the background, and without being influenced by external environments such as the condition of illumination.

In accordance with one aspect of the present invention, an image processing apparatus includes: a display portion; a height input portion which inputs height information about a target object; a setting portion which sets data for image processing in a setting mode; and a driving processing portion which receives an input image and processes the input image in the driving mode based on data which has been preliminarily set by the setting portion.

The setting portion includes a set-image display portion which displays, on the display portion, a first image acquired by photographing the target object in the setting mode, a threshold-value reception portion which receives threshold-value data about the height, according to inputs from the outside, and a first detection portion which detects, from the first image, a first partial image having height information specified by the threshold-value data, based on the height information inputted by the height input portion in the setting mode, and based on the threshold-value data received by the threshold-value reception portion.

The driving processing portion includes a driving-image display portion which receives a second image acquired by photographing the target object in the driving mode and displays the photographed target object on the display portion, and a second detection portion which detects, from the second image, a second partial image having height information specified by the threshold-value data, based on the height information inputted by the height input portion in the driving mode, and based on the threshold-value data received by the threshold-value reception portion in the setting mode.

Preferably, the setting portion displays the first partial image detected by the first detection portion on a screen of the display portion in the setting mode, such that a background image for the first partial image on the screen is displayed in a predetermined color.

According to this aspect, in the setting mode, the user can check the detected first partial image. If the user determines that a desired image has not been detected, he or she can make setting of the threshold-value data, again, through inputting from the outside.

Preferably, the predetermined color of the background image can be changed.

Preferably, the height information indicates the heights of the target object in correspondence with respective portions of an image of the target object.

Preferably, the height information indicates the heights of the target object in correspondence with respective portions of an image of the target object.

Preferably, the setting portion further includes a cross-sectional shape display portion which detects the height information about the portion of the first image which corresponds to a specified position therein, based on the height information inputted by the height input portion in the setting mode and displays, along with the first image, a first line indicative of the cross-sectional shape of the target object which corresponds to the specified position, based on the detected height information.

Preferably, the values of height information corresponding to the cross-sectional shape indicated by the first line are displayed in association with or near the first line. Preferably, it is possible to change over between display and non-display of the values of height information.

Preferably, the first image corresponds to a plane with two-dimensional coordinates which is defined by a first axis and a second axis orthogonal to each other, and the specified position is specified by coordinates through which second lines parallel with the first axis and the second axis are passed.

Preferably, a third line indicating height information specified by the threshold-value data received by the threshold-value reception portion is displayed along with the first image, in association with the first line.

Preferably, the values of height information is displayed in association with or near the third line. Preferably, it is possible to change over between display and non-display of the values of height information.

Preferably, the inputs from the outside include an area specification input which specifies a partial area in the first image displayed by the set-image display portion, and the height threshold-value data is specified by the height information about the portion corresponding to the specified area, out of the height information inputted by the height input portion.

Preferably, the inputs from the outside include a point specification input which specifies a plurality of points in the first image displayed by the set-image display portion, and the height threshold-value data is specified by the height of a plane passing through the portions corresponding to the specified plurality of points, out of the height information inputted by the height input portion.

Preferably, the plane includes an upper limit plane and a lower limit plane corresponding to an upper limit and a lower limit of the threshold data, the plurality of points include specified points for the upper limit plane and the lower limit planes, the height threshold-value data is specified by the height information about the upper limit plane and the lower limit plane, and the second detection portion detects the second partial image having the height information which is equal to or less than the height information about the upper limit plane and is equal to or more than the height information about the lower limit plane, based on the height information inputted by the height input portion in the driving mode, and based on the height information about the upper limit plane and the lower limit plane which is specified by the threshold-value data received by the threshold-value reception portion in the setting mode.

Preferably, the height information about the upper limit plane and the lower limit plane can be changed according to inputs from the outside.

Preferably, the height information about the target object in correspondence with the respective portions indicate tone values of an image in correspondence with the portions, the threshold-value reception portion includes a density-plane creation portion which detects portions of the first image which have a larger degree of density change than a degree of density change in a peripheral area, based on the tone values of the respective portions and the inputs from the outside and, further, creates a curved plane passing through the detected portions, and the threshold-value reception portion includes a plane threshold-value reception portion which receives the threshold-value data based on the height information corresponding to the portions through which the curved plane passes.

Preferably, the threshold-value data received by the plane threshold-value reception portion indicates the height information corresponding to the portions through which the curved plane passes after it has been updated based on an offset value.

Preferably, the offset value can be changed according to inputs from the outside.

Preferably, a size of the peripheral area can be changed according to inputs from the outside.

In accordance with another aspect of the present invention, an image processing method includes a setting step for setting data for image processing in a setting mode; and a driving processing step for receiving an input image and processing the input image based on data set in the setting step.

The setting step includes a set-image display step for displaying a first image acquired by photographing a target object in the setting mode, a threshold-value reception step for receiving threshold-value data about the height, according to inputs from outside, and a first detection step for detecting, from the first image, a first partial image having height information specified by the threshold-value data, based on the height information about the target object which has been inputted in the setting mode, and based on the threshold-value data received in the threshold-value reception step.

The driving processing step includes a driving-image display step for receiving a second image acquired by photographing the target object in the driving mode and displaying the photographed target object, and a second detection step for detecting, from the second image, a second partial image having height information specified by the threshold-value data, based on the height information about the target object which has been inputted in the driving mode, and based on the threshold-value data received in the threshold-value reception step in the setting mode.

With the present invention, a partial image corresponding to height threshold-value data according to inputs from the outside is detected from an image of the target object which has been created by photographing, based on height information about the target object. This enables detecting the partial image from the image created by photographing, without being subjected to restrains on the color and the pattern of the background for the target object, and without being influenced by changes of external environments such as the condition of illumination.

DETAILED DESCRIPTION

Figure 1:
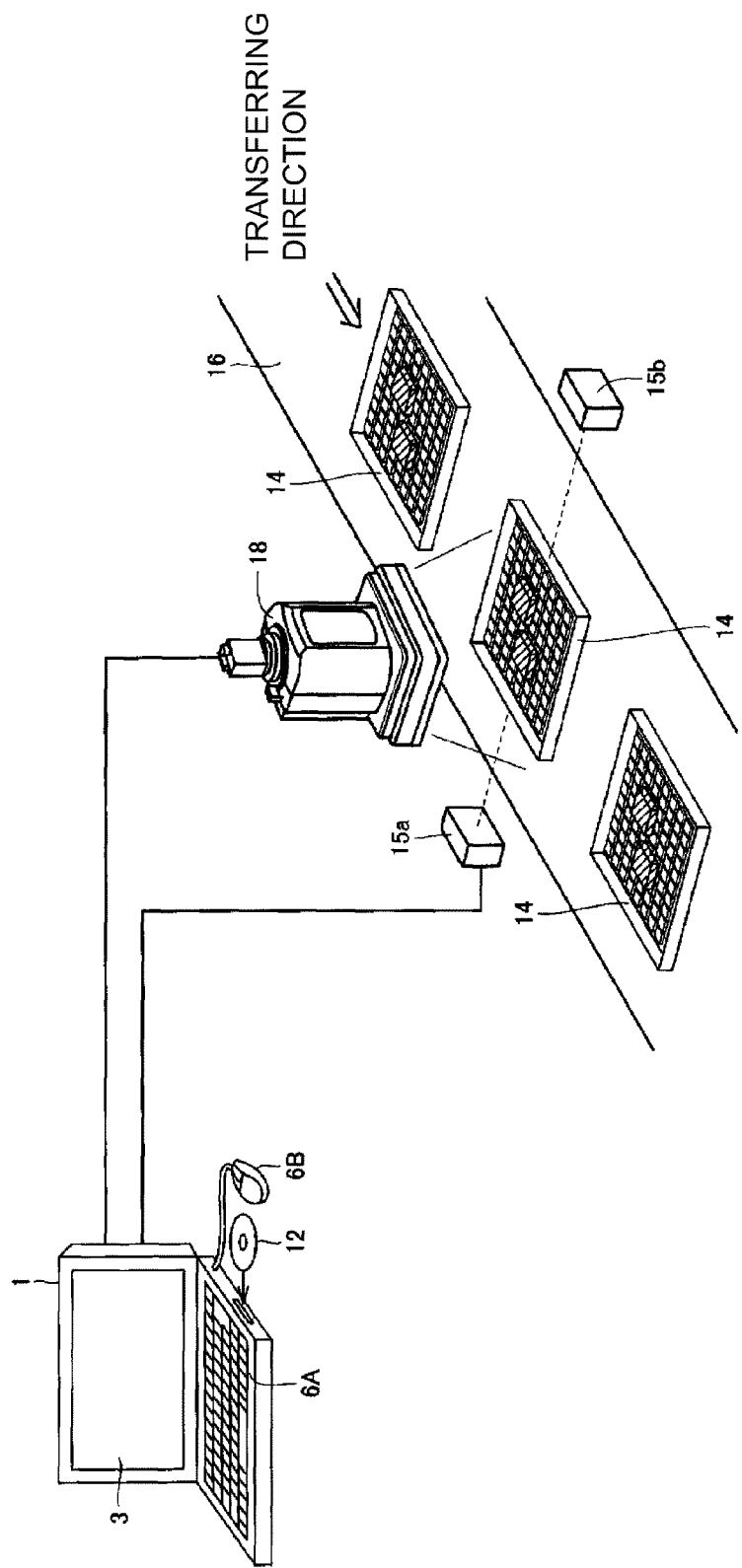
FIG. 1 is a schematic view illustrating the entire structure of an image processing apparatus according to an embodiment of the present invention.

Embodiments of the present invention will be described in detail with reference to the drawings. Further, like reference characters refer to the same or corresponding parts throughout the drawings, and description thereof will not be repeated.

(The Entire Apparatus Structure)

Referring to FIG. 1, an image processing apparatus 1 according to an embodiment of the present invention is capable of performing optical processing on target objects to be inspected (which may be referred to as "works" in some cases, hereinafter), by being incorporated in a production line, representatively. This optical processing includes detection of defects in work surfaces.

As an example, in the present embodiment, pallets 14 carrying works illustrated by diagonal lines are transferred by a transfer mechanism 16 such as a belt conveyer, and the transferred pallets 14 are successively photographed by a photographing portion 18. Image data (which will be referred to as "input images" in some cases, hereinafter) is transmitted to a computer 1 which functions as an image processing apparatus. Further, such input images may be either color images or monochrome images (gray scale) images.

An optoelectronic sensor placed at the opposite ends of the transfer mechanism 16 detects the pallets 14 having reached to the photographing range of the photographing portion 18. More specifically, the optoelectronic sensor is constituted by a light receiving portion 15a and a light projection portion 15b placed on the same optical axis, such that the light projection portion 15b emits light, and the light receiving portion 15a detects the emitted light which has been interrupted by a pallet 14 to detect the pallet 14 having reached to the photographing range of the photographing portion 18.

If the aforementioned optoelectronic sensor detects a pallet 14 having reached thereto, the photographing portion 18, in response thereto, starts photographing the pallet 14 including works. Also, it is possible to start detection of defects in works and other inspections and measurements at the timing when a pallet 14 having reached thereto is detected, while continuously performing photographing.

The photographing portion 18 includes a first camera portion 2A and a second camera portion 2B which will be described later.

A CD-ROM (Compact Disk-Read Only Memory) 12 is detachably mounted to the computer portion 1, and the computer 1 incorporates the function of accessing the mounted CD-ROM. Further, the computer portion 1 includes a key board 6A and a mouse 6B. Further, the computer 1 executes a program preliminarily stored therein for providing a method for supporting setting of parameters for use in image processing for detecting works to be inspected in images according to the present embodiment.

(The Hardware Structure)

Figure 2:
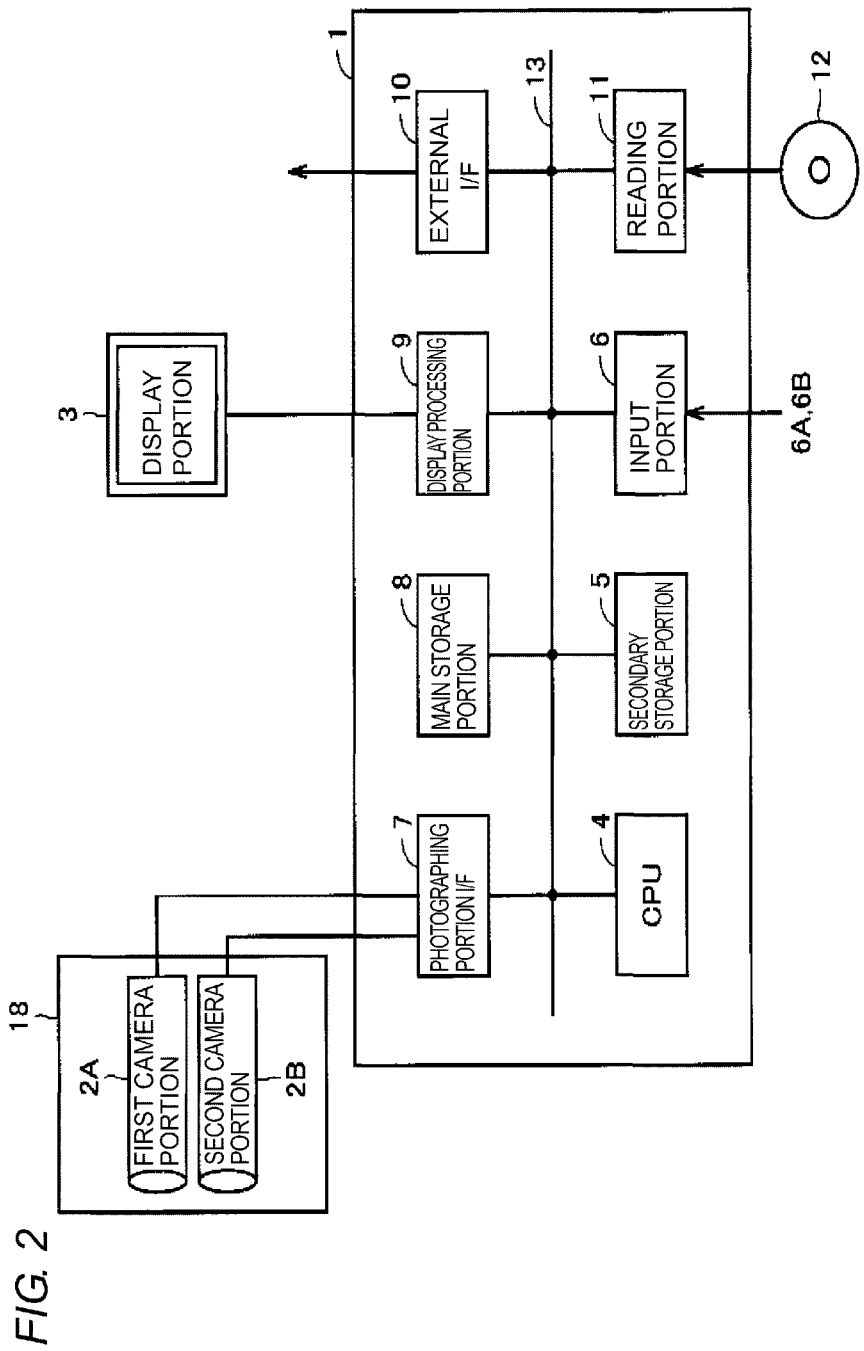
FIG. 2 is a schematic view illustrating the hardware structure of a computer which incorporates the image processing apparatus according to the embodiment of the present invention.

Referring to FIG. 2, the computer 1 includes a CPU (Central Processing Unit) 4, a main storage portion 8 including a ROM (Read Only Memory) and a RAM (Random Access Memory), a display processing portion 9 which performs processing for information display relating to the display portion 3, an external I/F (Interface) 10 for connection to external communication networks and the like, an input portion 6 for receiving input data from the key board 6A and the mouse 6B, a reading portion 11 which accesses a recording medium such as the CD-ROM 12 and reading data therefrom, a secondary storage portion 5 such as a hard disk, and a photographing portion I/F 7 for inputting image data created by photographing by the photographing portion 18. These portions are connected to one another through buses 13.

The photographing portion 18 includes the first camera portion 2A and the second camera portion 2B. If the aforementioned optoelectronic sensor detects a pallet 14 carrying works which has reached thereto, the first camera portion 2A, in response thereto, starts photographing the pallet 14 including the works.

As an example, the first camera portion 2A is structured to include an image pickup device partitioned into plural pixels, such as a CCD (Charge Coupled Device) or a CIS (Contact Image sensor), in addition to optical systems such as lenses. The second camera portion 2B is provided for performing photographing for distance images, which will be described later.

The image processing apparatus according to the present embodiment is realized by causing the CPU 4 to execute programs, using computer hardware, such as the main storage portion 8, the secondary storage portion 5 and the CD-ROM 12. In general, these programs are stored in a recording medium, such as the CD-ROM 12, and are distributed through various communication networks, such as the Internet. Further, these programs are read from the recording medium such as the CD-ROM 12 and is temporarily stored in the secondary storage portion 5 which is an internal storage device. Further, these programs are read from the secondary storage portion 5 into the main storage portion 8 and then are executed by the CPU 4.

The CPU 4 is a calculation processing portion which executes various types of calculations, by sequentially executing programmed commands.

The photographing portion I/F 7 intermediates between the computer 1 and the photographing portion 18 for data communication therebetween. The photographing portion I/F 7 preferably includes an image buffer. The image buffer temporarily accumulates input image data resulted from photographing which have been successively transferred through the photographing I/F 7. Further, if input image data resulted from one photographing is accumulated therein, the image buffer transfers the accumulated data to the main storage portion 8 or the secondary storage portion 5.

The external I/F 10 is a device which intermediates between the computer 1 and external devices for data communication therebetween. The external I/F 10 receives detection signals from the aforementioned optoelectronic sensor and the like and transfers the received signals to the CPU 4.

The secondary storage portion 5 is a nonvolatile storage device which stores input image data and programs to be executed by the CPU 4.

The display portion 3 which is connected to the computer 1 is for displaying information (including images) outputted from the CPU 4 and is constituted by an LCD (Liquid Crystal Display), a CRT (Cathode Ray Tube) or the like.

The mouse 6B receives commands from the user, according to clicking operations, sliding operations and other operations. The key board 6A receives commands from the user, according to inputs to keys therein.

Further, another output device, such as a printer, can be connected to the computer 1, as required.

The CPU 4 displays screens on the display portion 3 in the image processing apparatus according to the present embodiment, in cooperation with a graphic board, which is not illustrated. The display of such screens is realized by a GUI (Graphical User Interface) programs incorporated as a portion of an OS (Operating System), and the GUI provides an environment which enables the user to make various user settings, by using a cursor on the screen which is operated through the key board 6A and the mouse 6B.

(Height Threshold-Value Specification Method)

The image processing apparatus according to the present embodiment is adapted to determine the absolute distance and a relative distance to works and creates a distance image which will be described later, in order to detect a work image area from an input image.

An arbitrary height range is specified in the created distance image, and only the portion corresponding to the specified range is extracted from the input image for detecting an image of interest to be subjected to defect inspections.

In the present embodiment, such a distance image is an image indicating height information exhibited by an input image with a gray scale. Namely, the luminance levels at the respective pixels in the input image are varied depending on the distance from the photographing portion 18 (whether it is far or close) to the target object to be photographed and, therefore, height information corresponding to the distance to the target object in correspondence with the respective pixels is detected based on the difference of the luminance levels. Further, the detected height information is converted into tone information according to predetermined procedures, and an image is created according to the tone information resulted from the conversion, thereby detecting a distance image.

As a distance determination method, there is a shape-from-focus method which overlaps images which are brought into focus to create an image and further determines the distance to target object from the focal length of the created image. Further, there is a TOF (Time Of Flight) method which detects the distance to a target object, based on the light flight time from emission of light from a light source until the light is reflected by a target object surface and reaches a sensor. Further, there are a method which applies a laser as a line beam to a target object and detects the distance from reflected light components, and a stereo method using two cameras. In the present embodiment, such a stereo camera using two cameras is employed for distance determination, but the distance determination method is not limited thereto and can be other methods.

Such a distance determination method using a stereo camera is well known. In brief, plural cameras are caused to photograph a target object at the same time in plural different directions, so that information about the target object in the depthwise direction can be recorded. In the present embodiment, the second camera portion 2B includes two cameras placed at different positions. The two cameras photograph a single target object (a pallet 14 or the like), which induces a parallax between the images created by the photographing by the two cameras (the cameras placed at different positions in the left and right sides). The CPU 4 calculates the distance from the cameras to the target object, based on the images created by the photographing, based on this parallax, according to a predetermined calculation equation, to obtain information about the distance to the target object. Further, the CPU 4 displaces the two cameras, little by little, and determines the distances from the cameras at respective points above the target object surface to these points. This enables detection of distance information in correspondence with portions corresponding to the respective points above the target object surface or in correspondence with the respective pixels. Based on the height information which is the detected distance information, the CPU 4 searches an LUT (Look Up Table), further reads corresponding gray scale values (tone information) from the LUT and creates a distance image based on the read tone information.

Figure 3:
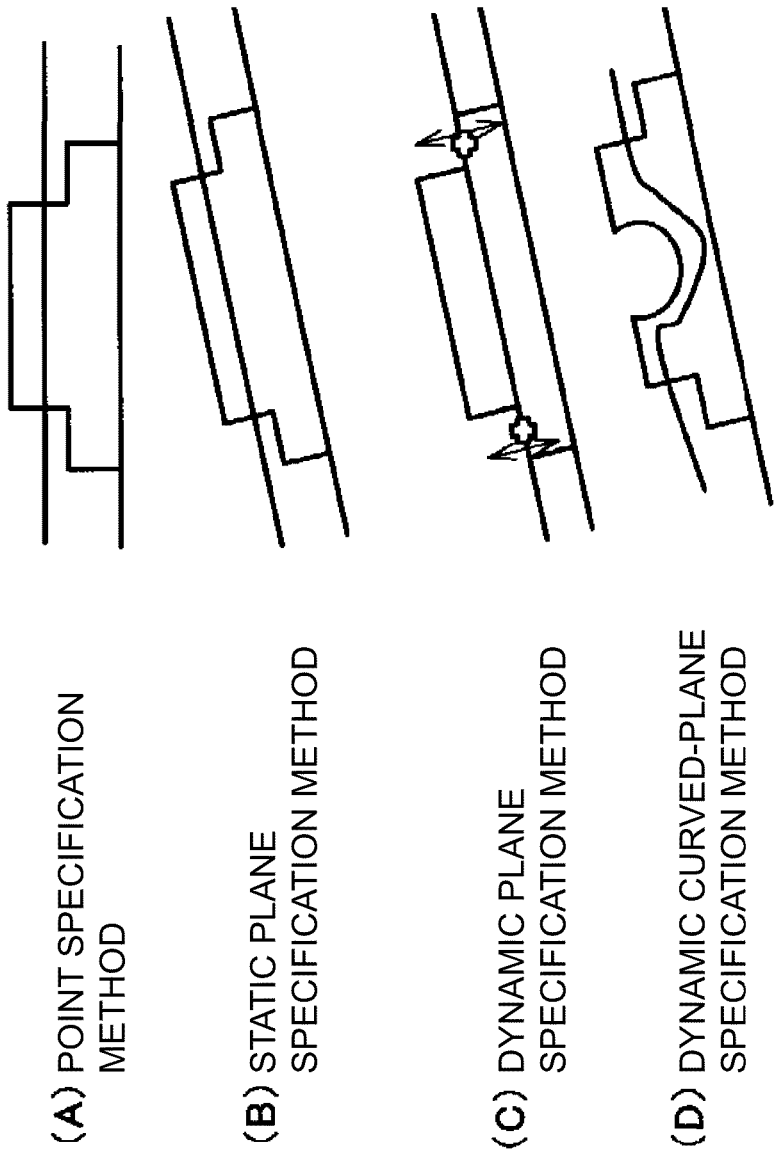
FIGS. 3A to D are views illustrating height threshold-value specification methods according to an embodiment of the present invention.

In the detected distance image as described above, FIGS. 3(A) to (D) schematically illustrate methods for specifying threshold value (height threshold values) for use in detecting an image area to be extracted as a target object to be inspected. When the target object is certainly horizontal with respect to a reference plane, it is possible to specify height threshold values, according to a "point specification method" (FIG. 3A). When the target object is certainly placed with a constant inclination with respect to a reference plane, it is possible to specify height threshold values, according to a "static-plane specification method" (FIG. 3B). When the inclination of the target object with respect to a reference plane is varied, it is possible to specify height threshold values, according to a "dynamic plane specification method" (FIG. 3C). When the target object has an unstable shape, it is possible to specify height threshold values, according to a "dynamic curved-plane specification method" (FIG. 3D).

In this case, the reference plane refers to a plane orthogonal to the optical axes of the cameras in the photographing portion 18 or a transferring surface of the conveyer. Thus, the reference plane is a plane indicating an inclination with respect to a predetermined coordinate system, based on the predetermined coordinate system.

(Schematic Flow Chart)

Figure 4:
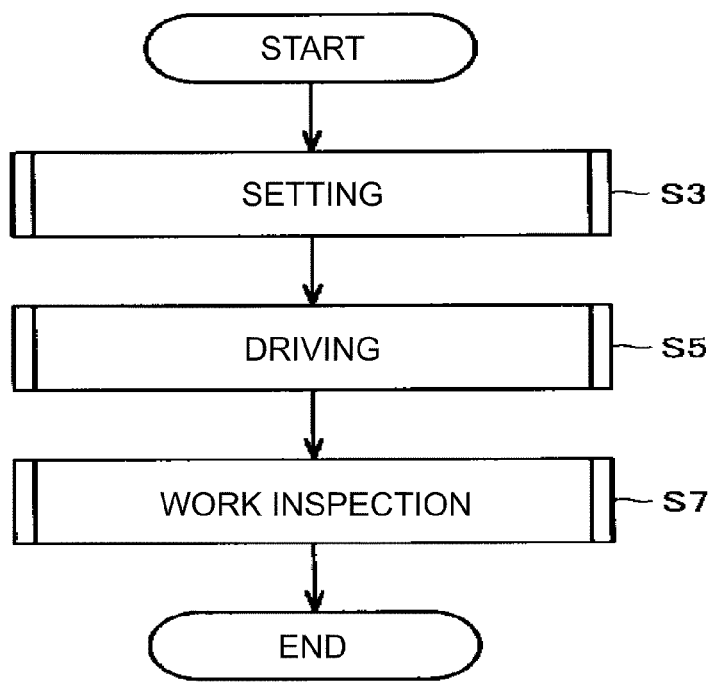
FIG. 4 is a schematic flow chart of overall processing according to the embodiment of the present invention.

Referring to FIG. 4, the image processing apparatus according to the present embodiment has a parameter setting mode, a driving mode and an inspection mode, as operation modes. It is possible to change over among these operation modes, according to inputs from the outside.

The image processing apparatus can perform overall processing including processing for setting parameters for use in extracting (detecting) an image of interest from a distance image in the parameter setting mode (step S3), driving processing for detecting an image to be inspected from an input image using preset parameters in the driving mode (step S5), and processing for inspections for defects in works using the image detected through the driving processing in the inspection mode (step S7). Further, in FIG. 4, steps S3 to S7 are illustrated as being continuously executed, but the order of execution of the respective processing is not limited thereto, provided that necessary parameter values or image data have been detected when the processing in the early stages illustrated in FIG. 4 is completed.

(Schematic Processing for Setting Parameters)

Figure 5:
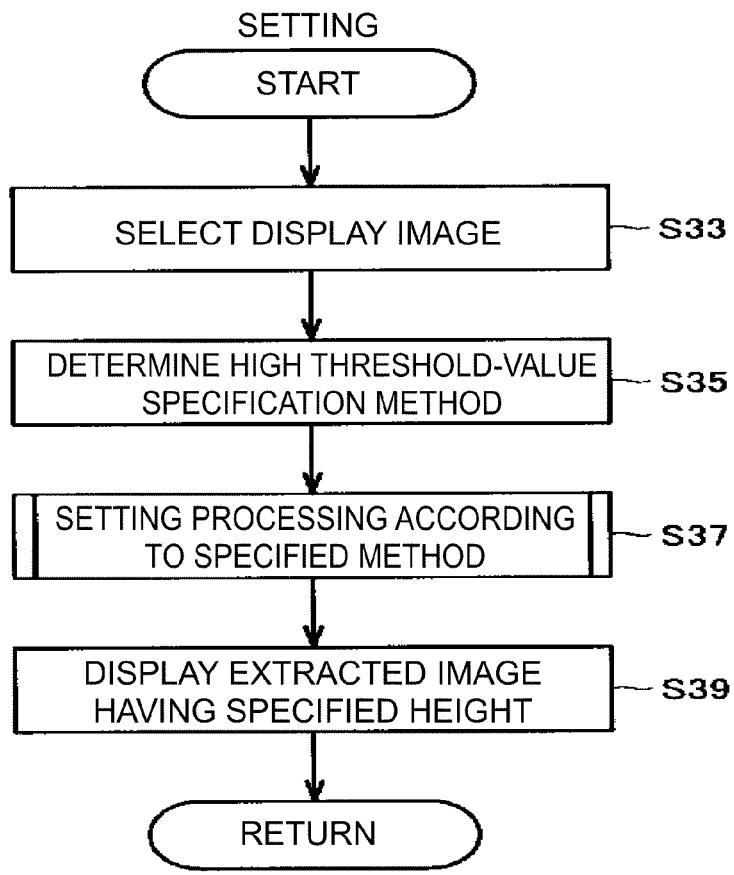
FIG. 5 is a schematic flow chart of setting processing according to an embodiment of the present invention.

Referring to FIG. 5, the parameter setting processing (step3) in FIG. 4 includes inputting of selection of a display image by the user (step S33) at first, selectively determining a height threshold-value specification method (any one of the methods in FIG. 3(A) to (D)) (step S35), processing for setting parameter values according to the determined height threshold-value specification method (step S37), and processing for displaying an image extracted from the display image selected in step33 (step S39). Hereinafter, the processing in the respective steps will be described.

Selection of a display image in step33 in FIG. 5 will be described, with reference to FIG. 6 and FIGS. 7(A) to (C).

Figure 6:
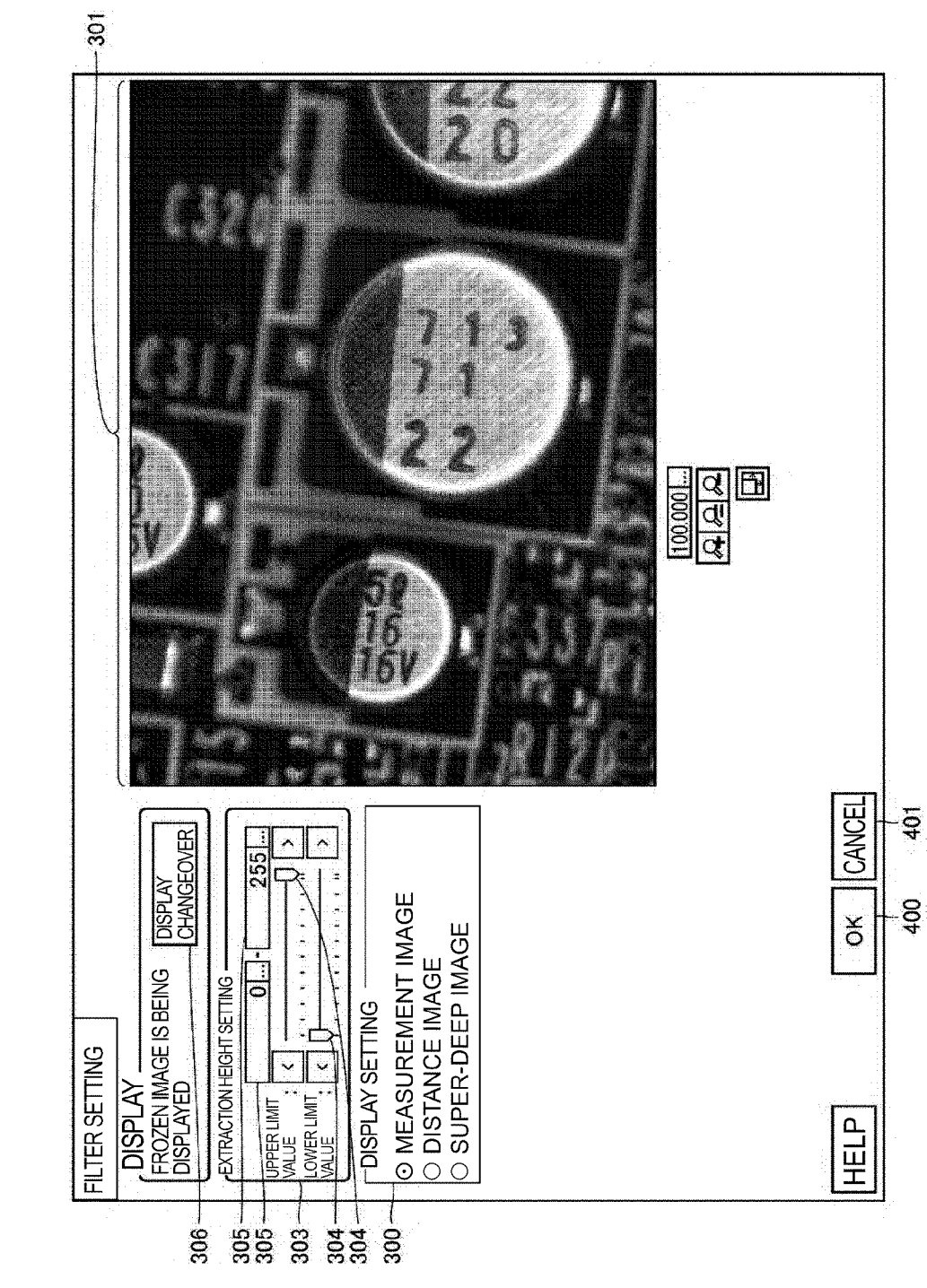
FIG. 6 is a view illustrating selection of a display image according to the embodiment of the present invention.

In step33 in FIG. 5, a screen in FIG. 6 is displayed on the display portion 3. In the screen in FIG. 6, there are displayed an image area 301 for displaying an image, a "display changeover" tab 306, a "display setting" area 300, an "OK" button 400 which is operated for generating a command for storage of set parameters, and a "cancel" button 401 which is operated for generating a command for cancel of operations.

The "Display Setting" area 300 is an area which receives inputs for setting a type of images to be displayed in the image area 301. In this case, it is possible to select any of "Measurement Image" which indicate input images resulted from photographing by the first camera portion 2A, "Distance Image" and "Super-deep Image". In FIG. 6, "Input Image" is being selected, and an input image is being displayed in the image area 301. The "Display Changeover" tab 306 is selectively operated for changing over between moving images and static images, with respect to the image displayed in the image area 301.

Figure 7A:
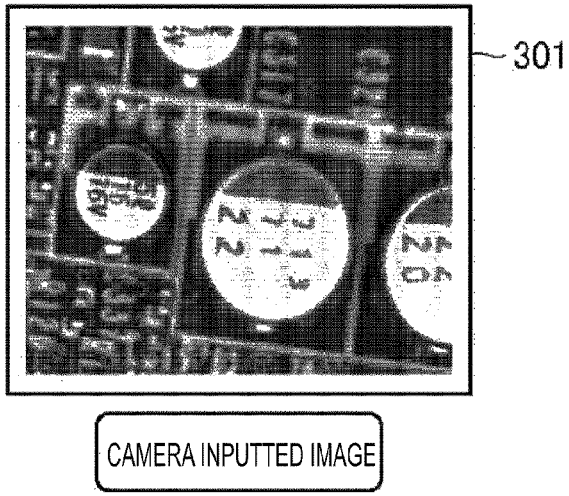
FIGS. 7A to C are views illustrating exemplary candidate images to be selected as a display image according to the embodiment of the present invention.
Figure 7B:
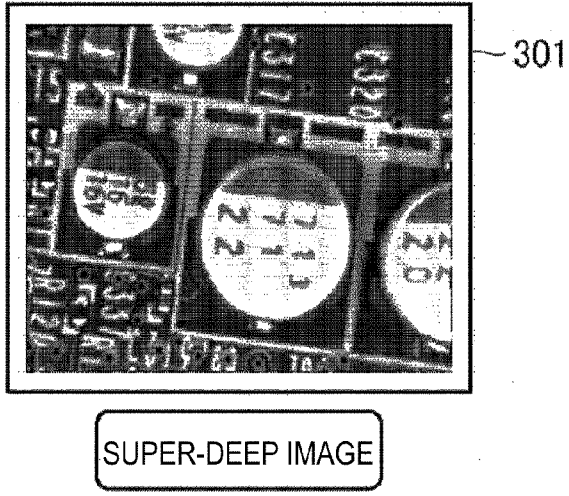
Figure 7C:
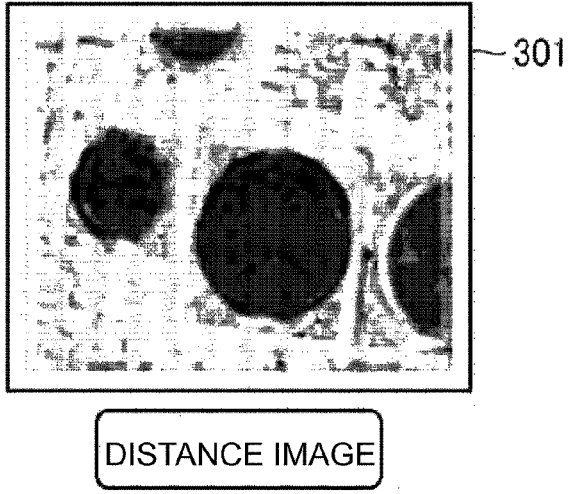

FIGS. 7(A) to (C) illustrate images displayed in the image area 301 in FIG. 6. FIG. 7(A) illustrates an input image which is an image created by photographing by the first camera portion 2A, FIG. 7(B) illustrates a super-deep image, and FIG. 7(C) illustrates a distance image. Such a super-deep image is an image which is brought into focus at all points therein and is displayed for providing, for the user, a clearer image than the input image. Such a super-deep image can be created by photographing a target object plural times with the first camera portion 2A and overlapping these images with one another according to the shape-from-focus method. The CPU 4 creates such a super-deep image by synthesizing input images outputted from the first camera portion 2A, according to the shape-from-focus method. The created super-deep image is stored in the main storage portion 8, and the data of the super-deep image is read from the main storage portion 8 and then is displayed on the display portion 3.

The CPU 4 also creates a distance image according to the aforementioned procedures and stores the distance image in the main storage portion 8. The data of the distance image is read from the main storage portion 8 and is displayed on the display portion 3.

Figure 8:
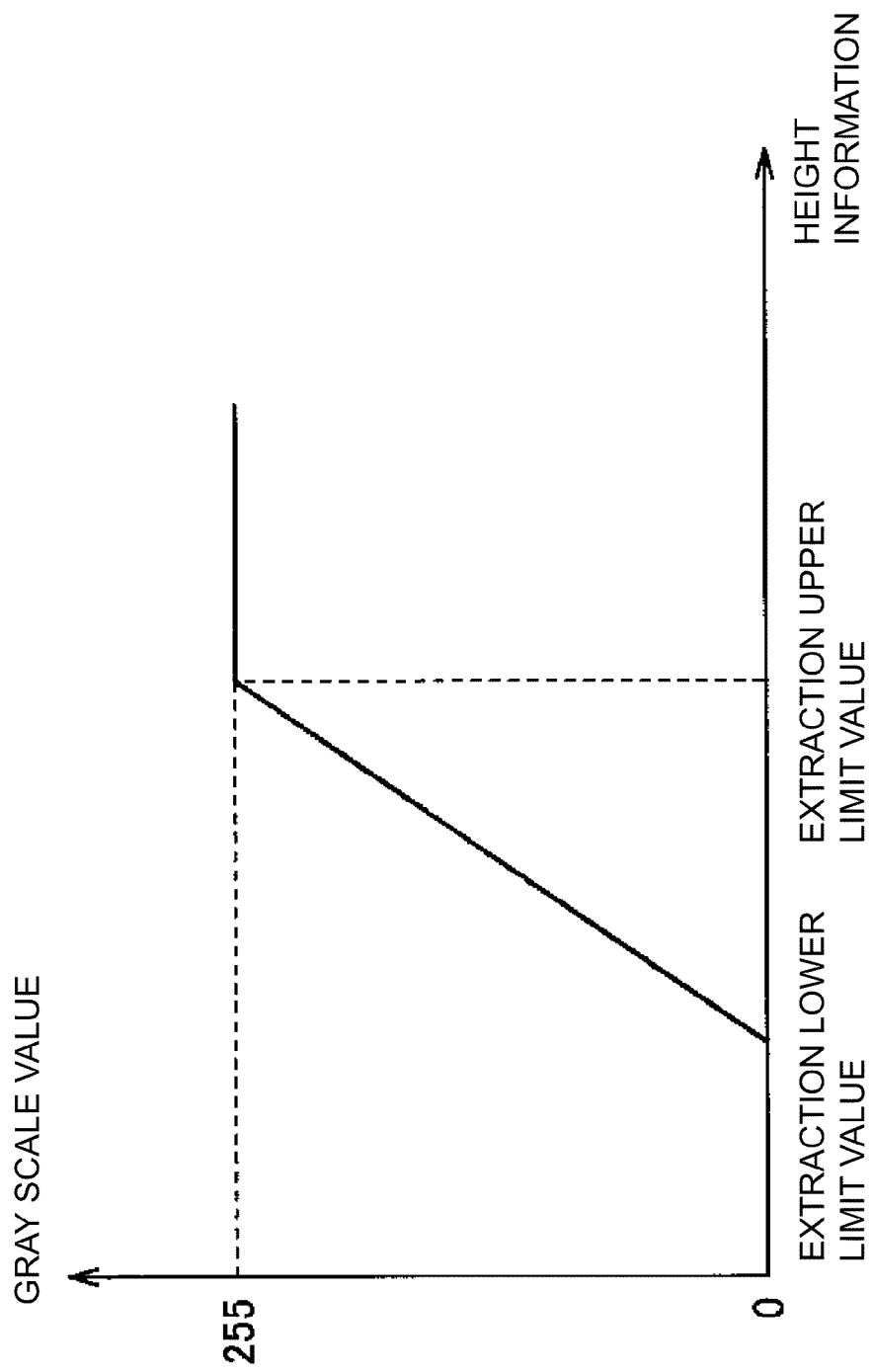
FIG. 8 is a view illustrating procedures for creating an LUT according to the embodiment of the present invention.

FIG. 8 schematically illustrates the content of the look up table (LUT). The LUT stores gray scale values in association with respective height information. The LUT is determined by using, as input values, height information detected using the aforementioned stereo camera, and corresponding gray scale values are read therefrom as output values for creating a distance image using the read gray scale values. In this case, gray scale values (tone values) are values in the range of 0 to 255, and height information has an upper limit value and a lower limit value corresponding to gray scale values (tone values). The distance image has coordinate values (X, Y, Z) in association with the respective pixels therein. Each Z coordinate value is a coordinate along a Z axis orthogonal to the reference plane and indicates height information, while the coordinate values (X, Y) are coordinates along an X axis and a Y axis which are orthogonal to the Z axis. The reference plane and images are assumed to be planes having two-dimensional coordinates which are defined by the X axis and the Y axis which are orthogonal to each other.

In this case, for selection of a display image, a super-deep image (see FIG. 7(B)) is suggested as a reference image for the input image, but "Distance-Information Superimposed Image" can be suggested, instead of super-deep images. The CPU 4 detects such a "Distance-Information Superimposed Image", as follows.

Namely, an input image or a super-deep image which is an image created by photographing by the first camera portion 2A is converted into a gray scale image, based on the tone values of the respective pixels. Further, based on the tone values of the respective pixels in the gray scale image, the LUT is searched, and the corresponding height information is read therefrom. Further, the read height information is processed according to a predetermined conversion equation for calculating the respective tone values for R (red), G (green) and B (blue) corresponding to the respective pixels. Image data is created using the tone values for the three primary colors (RGB) which have been determined through the calculations. The created image data indicates a "Distance-Information Superimposed Image". When such a "Distance-Information Superimposed Image" is displayed on the display portion 3, the user can check, from color differences therein, the height information exhibited by the input image.

(The Display of Profile)

Figure 9:
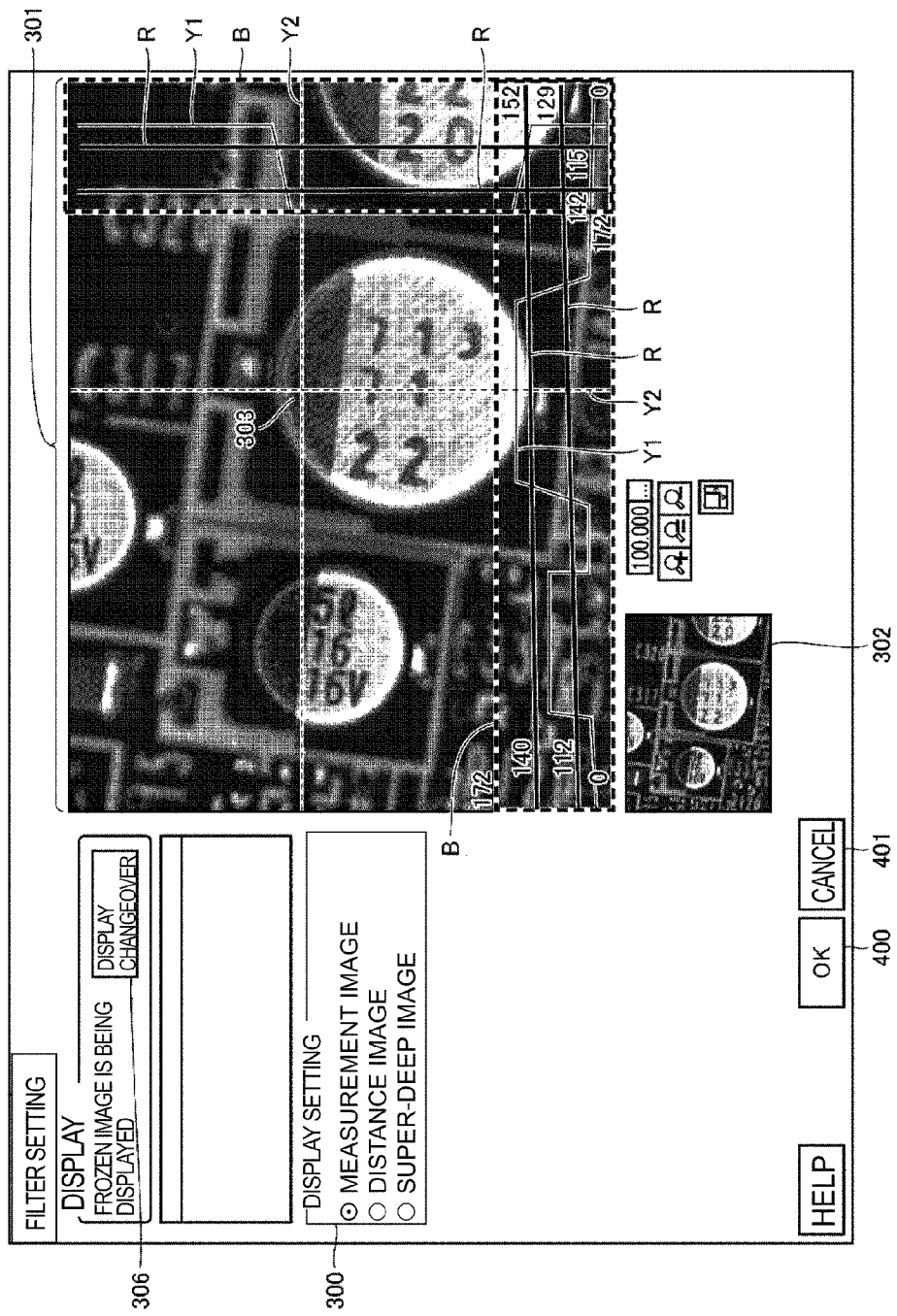
FIG. 9 is a view illustrating display of a profile in an image, according to the embodiment of the present invention.

In the present embodiment, for setting parameters, along with an input image displayed on the image area 301 in FIG. 9, based on the height information about a predetermined position in this input image, it is possible to display a profile indicative of the cross-sectional shape of work which corresponds to the predetermined position, by superimposing the profile thereon.

For displaying profile information about height information, any one of four types "horizontal and vertical", "only horizontal", "only vertical" and "non display" can be selected. In this case, assuming that a plane parallel with the reference plane is a plane with two-dimensional coordinates which is defined by the X axis and the Y axis orthogonal to each other, "vertical" indicates the direction in which the Y axis extends, and "horizontal" indicates the direction in which the X axis extends. When selecting profile display, the user clicks a desired position in the image area 301 by operating the mouse 6B. This desired position refers to a "tap position".

Referring to FIG. 9, if a tap position 303 is specified, the CPU 4 draws yellow broken lines Y2 orthogonal to each other at the coordinates (X, Y) of the tap position 303 in the image area 301 by superimposing the lines Y2 on the image. In this case, it is assumed that the user has preliminarily selected "horizontal and vertical" for profile display.

Subsequently, based on the selection of "horizontal and vertical" by the user, and based on the height information about the distance image stored in the main storage portion 8, the CPU 4 extracts the height information about the respective pixels through which the broken lines Y2 pass, further plots the values indicated by the height information about the corresponding pixels in the vertical (Y) direction and the horizontal (X) direction, and connects these plotted values to one another with yellow solid lines Y1. The solid lines Y1 drawn to be superimposed on the image are referred to as a profile. Since the profile is displayed, the user can check the change of the height information about the work (the height of the cross-sectional shape thereof) along the horizontal axis and the vertical axis (corresponding to the broken lines Y2) which are orthogonal to each other at the tap position 303.

The CPU 4 draws blue broken lines B in the image area 301 for indicating the upper limit value and the lower limit value of the height information, by superimposing the lines B on the image. These broken lines B can provide, for the user, information about the scale (the resolution) for specification of height information by the user. The upper limit value and the lower limit value are detected from the distance image. The upper limit value and the lower limit value which have been detected are displayed near the broken lines B.

The user draws red solid lines R which are vertical and horizontal lines in the image area 301 by operating the mouse 6B, while referring to the broken lines B and the upper and lower limit values, in order to specify a plane having height information which is desired to be extracted. With respect to the drawn solid lines R, the CPU 4 calculates the numerical values of the heights according to the scale indicated by the broken lines B, and then displays the calculated values near the solid lines R. This enables the user to check the height information about the desired extraction plane, through the numerical values.

In FIG. 9, with respect to the broken lines B corresponding to the scale and the solid lines R indicative of the height information about the extraction plane, there are displayed the numerical values of the height information near the lines, but the display thereof can be eliminated. Further, it is possible to enable changeover between display and non-display of numerical values, according to inputs of the selection by the user.

(The Specification of Height Threshold Values)

When a desired method is selected from the height threshold-value specification methods illustrated in FIGS. 3(A) to (D), the CPU 4 displays a list of these methods on the display portion 3, and the user inputs a selection of a desired method out of the list, by operating the key board 6A or the mouse 6B. The CPU 4 executes a program according to a processing flow chart for the height threshold-value specification method which has been selectively specified.

(The Point Specification Method)

According to the flow chart in FIG. 10, with reference to exemplary displayed screens in FIG. 11 and FIG. 12, there will be described a method for specifying height threshold values relating to an extraction plane according to the point specification method.

Figure 11:
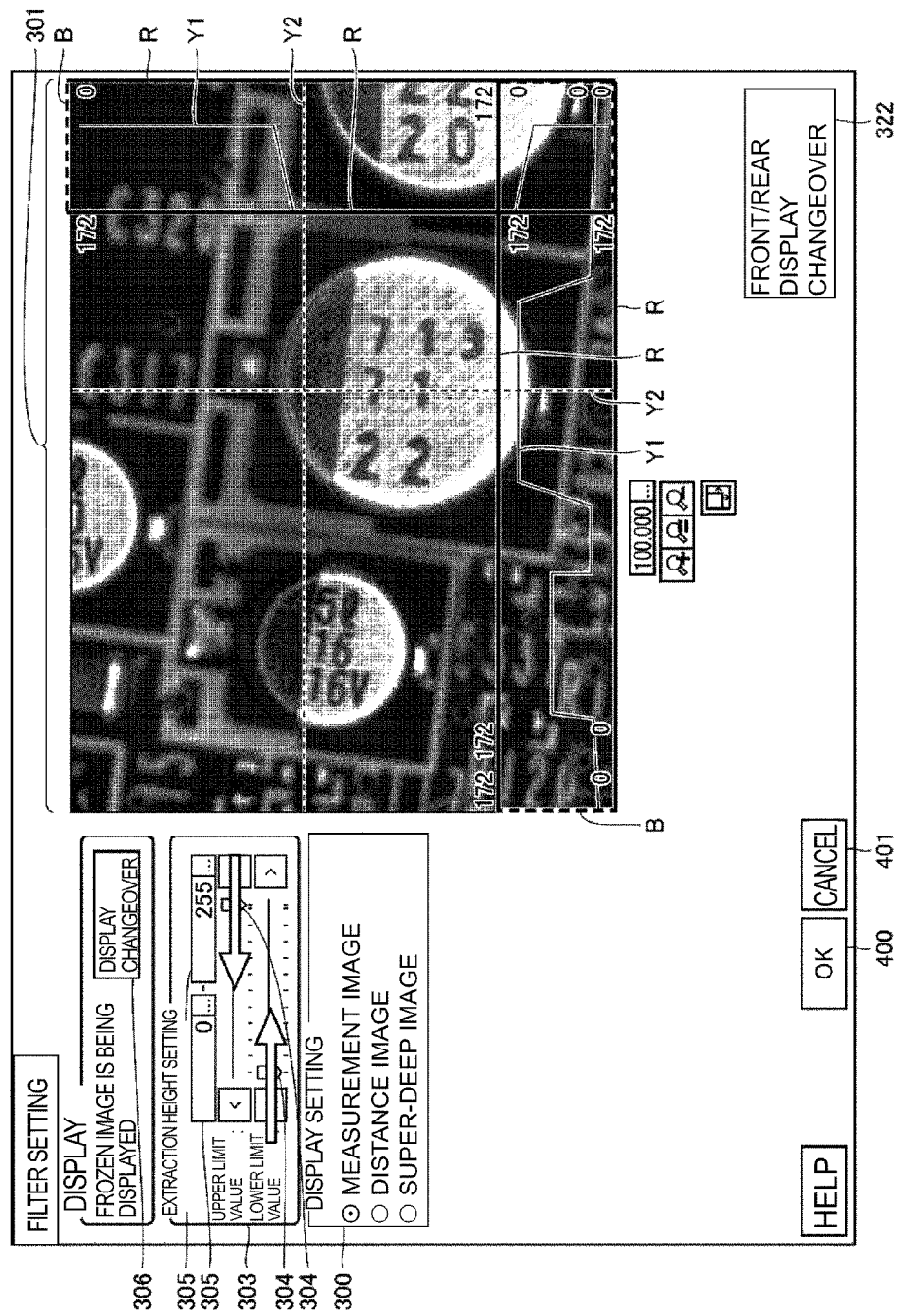
FIG. 11 is a view illustrating an exemplary screen displayed in the processing flow chart in FIG. 10.

FIG. 11 illustrates a screen for setting height threshold values according to the point specification method, at a state where a profile is displayed. In an area 303 in FIG. 11, there are displayed sliders for specifying height threshold values for the upper limit and the lower limit. These sliders are each constituted by a bar having scale marks for height information and a button 304 which moves on the bar in the direction of an arrow in the figure according to dragging operations on the mouse 6B. The scales of the scale marks on the bars are determined according to the upper and lower limit values of the height information which are indicated by the blue broken lines B. If the user moves the buttons 304 on the bars to positions illustrated in FIG. 12, for example, by sliding the buttons 304 through dragging operations, the CPU 4 reads the positions on the bars after they have been moved, further calculates the values of the height information which correspond to the read positions as the upper and lower limit values, and displays the calculated upper and lower limit values in boxes 305.

Figure 12:
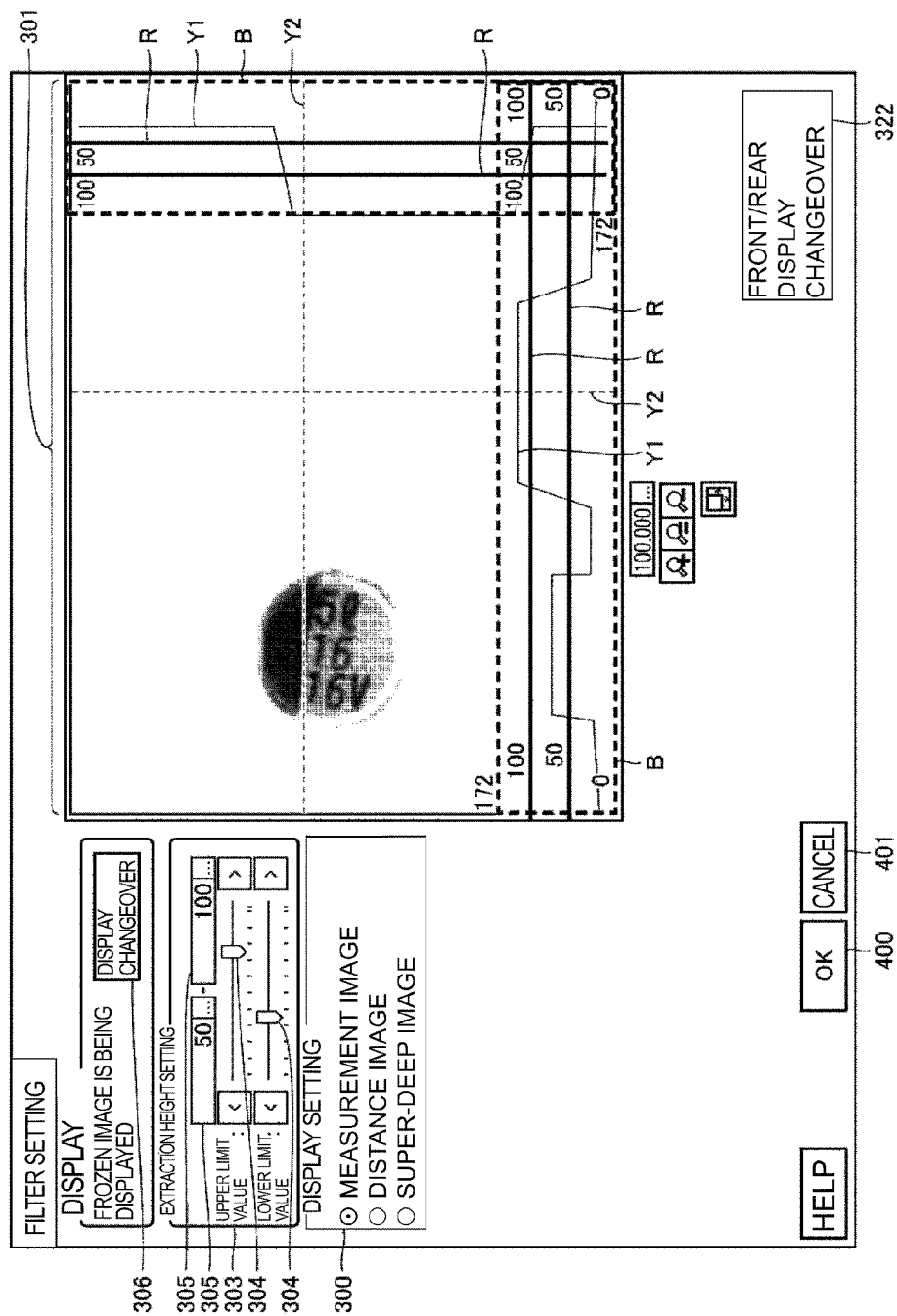
FIG. 12 is a view illustrating another exemplary screen displayed in the processing flow chart in FIG. 10.

In the boxes 305 in FIG. 12, there are displayed the upper limit value (=100) and the lower limit value (=50) out of the height threshold values specified through the slider operations. In FIG. 12, as an image displayed in the image area 301, there is displayed a partial image in the area corresponding to the specified threshold values, which has been extracted from the display image selected by the user in step33. For the background image therefor, the user can specify a desired display color. The display color is preferably such a color as to make the extracted image conspicuous. The image displayed in the image area 301 can be changed over between only the partial image (the extracted image) corresponding to the specified height threshold value as in FIG. 12 and the image which has not been subjected to extraction (the entire image selected in step33) by operating a "Front/Rear Display Changeover" tab 322.

Further, if the user updates the upper and lower limit values by sliding the buttons 304 on the bars through a dragging operation in the screen in FIG. 12, the CPU 4 performs processing for treating this dragging operation as an interrupt. Thus, in response to this interrupt, the CPU 4 performs processing for detecting an image corresponding to the updated upper and lower limit values from the image specified in step33 and, also, for updating the display in the image area 301 in FIG. 12 using this detected image.

Figure 10:
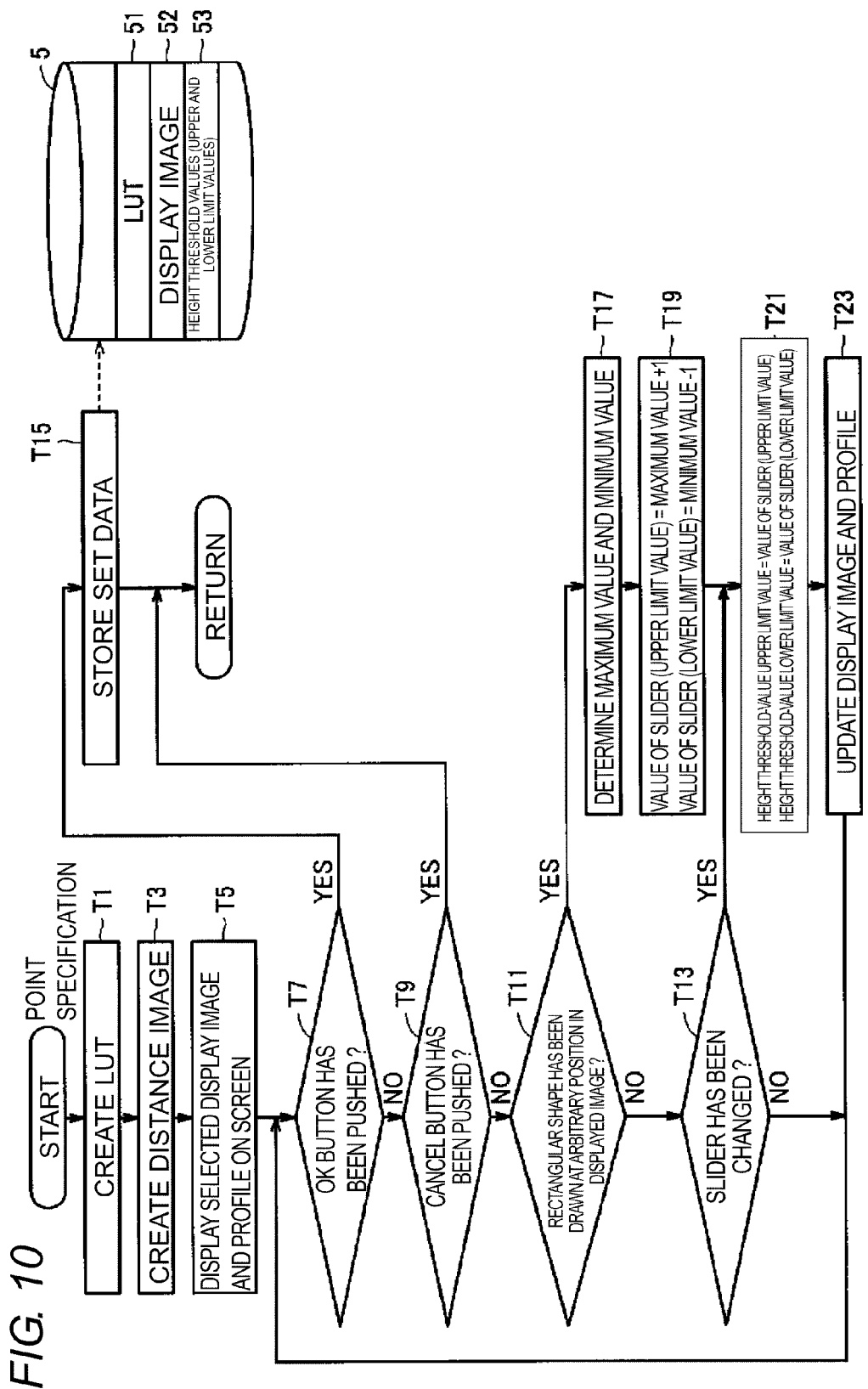
FIG. 10 is a processing flow chart for parameter setting according to a point specification method according to the embodiment of the present invention.

Referring to FIG. 10, in operation, the CPU 4 creates an LUT as illustrated in FIG. 8, according to information inputted by the user through the key board 6A or the mouse 6B (step T1).

Subsequently, the CPU 4 creates and stores a distance image, according to the aforementioned procedures, based on image information having a parallax in the stereo camera which has been inputted from the second camera portion 2B (step T3).

Subsequently, the CPU 4 displays, in the image area 301, the display image selected by the user in step33 and a profile according to user's operations (step T5). Thus, the selected display image and the profile indicated by yellow solid lines Y2 according to the specified tap position 303 are displayed in the image area 301 in FIG. 9. Along therewith, blue broken lines B indicative of a scale are displayed therein.

Subsequently, the CPU 4 determines whether or not the "OK" button 400 has been clicked (step T7). When the user completes the parameter setting according to the point specification method, he or she clicks the "OK" button 400. When it has been clicked, the CPU 4 stores the set data in the secondary storage portion 5. At this time, as shown in the Figure, the secondary storage portion 5 has stored information including the LUT data 51 created in step T1, the data 52 of the display image which is to be displayed in the image display area 301, and the data 53 of the threshold values (the upper and lower limit values) of the height information about the extraction plane set by the user through slider operations (ST15), as illustrated in the figure.

Although in step T15, the data is stored in the secondary storage portion 5, it can be stored in the main storage portion 8.

After the completion of the data storage, the processing returns to the original processing (the processing in FIG. 5).

If it is determined that the "OK" button 400 has not been clicked (No in step T7), it is determined whether or not the "Cancel" button 401 has been operated (step T9). When the user cancels the parameter setting operation, he or she operates the "Cancel" button 401. Therefore, if the CPU 4 detects the "Cancel" button 401 having been operated (Yes in step T9), the CPU 4 stores none of the set data and returns the processing to the original processing.

Figure 13:
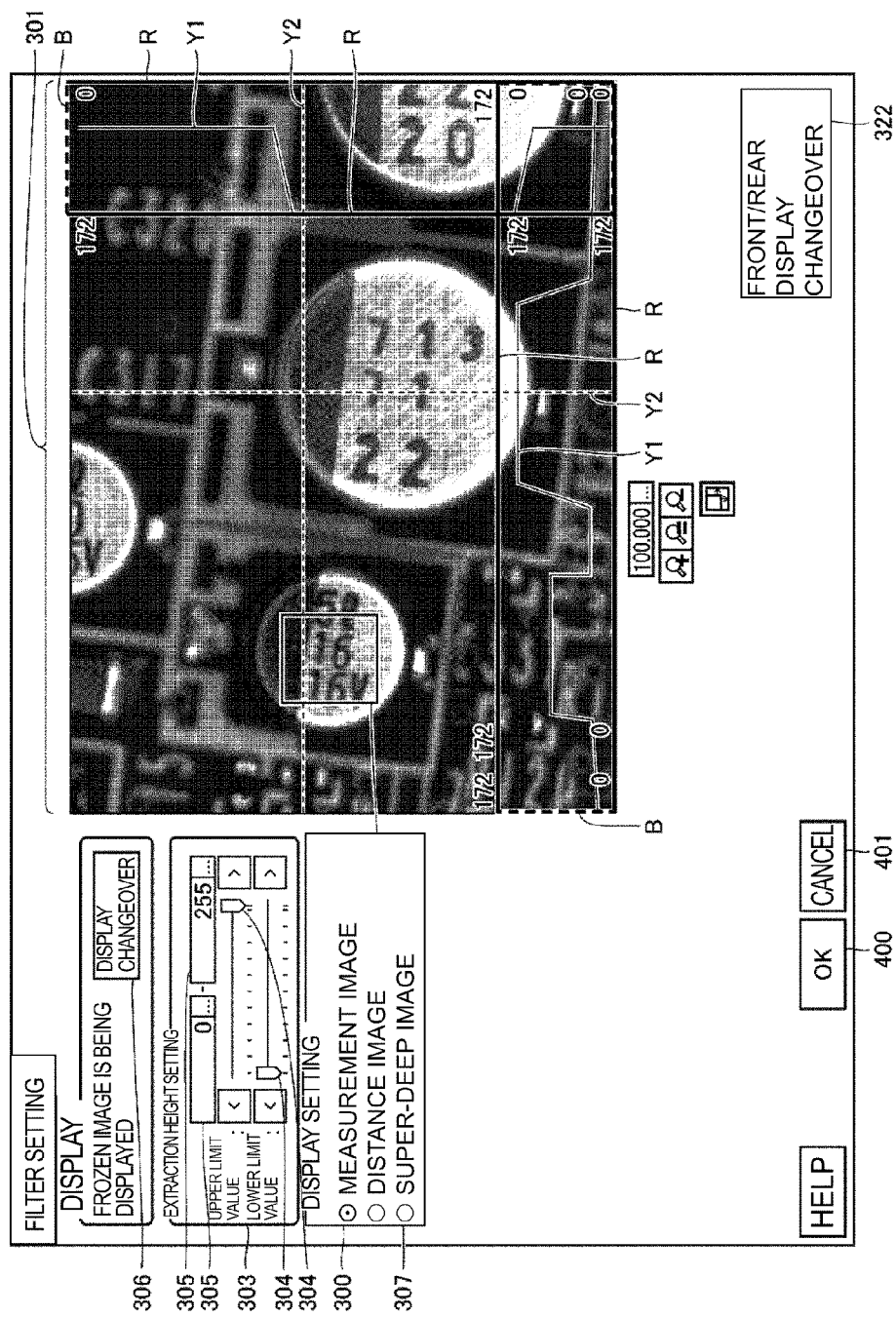
FIG. 13 is a view illustrating still another exemplary screen displayed in the processing flow chart in FIG. 10.

If it is determined that the "Cancel" button 401 has not been operated (No in step T9), the CPU 4 determines whether or not a rectangular shape 307 has been drawn through user's operations at an arbitrary position on the display image in the image area 301 (see FIG. 13).

Figure 14:
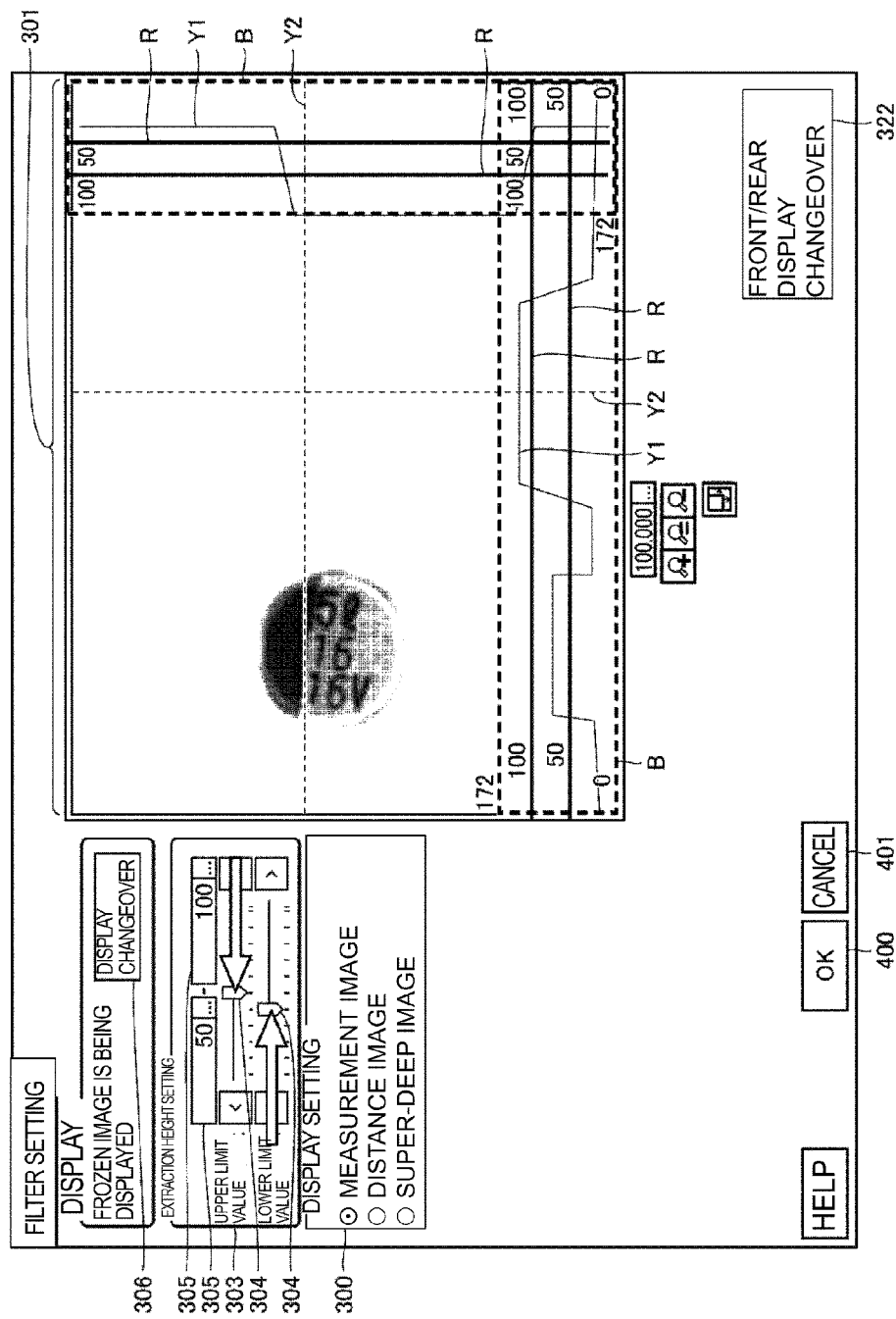
FIG. 14 is a view illustrating still another exemplary screen displayed in the processing flow chart in FIG. 10.

If it is determined that a rectangular shape 307 has been drawn (Yes in step T11), the maximum value and the minimum value of the heights indicated by the height information about the image in this rectangular shape 307 are detected from the corresponding distance image, based on the coordinate values in the area in the rectangular shape 307 (step T17). Based on the detected maximum and minimum values, the CPU 4 slides (moves) the button 304 on the bar relating to the upper limit value in the area 303 in FIG. 13 to the position corresponding to the detected maximum value +1 and, similarly, slides (moves) the button 304 on the bar relating to the lower limit value to the position corresponding to the detected minimum value −1 (see FIG. 14).

Subsequently, the CPU 4 updates the values 305 of the upper and lower limit values out of the height threshold values in the area 303 to the upper and lower limit values specified by the buttons 304 which have been moved (step T21).

Subsequently, the CPU 4 draws solid lines R in the image area 301 according to the values 305 set in step T21, further performs "Image Extraction" based on the values 305, and displays the detected extracted image (step T23). Thereafter, the processing returns to step T7.

In this case, "Image Extraction" refers to searching a distance image, further detecting the coordinates (X, Y, Z) of the pixels having Z coordinates values corresponding to the height information having the values 305 set in step T21, further searching the data of the display image selected in step33 based on the detected coordinates and reading only the image data constituted by the pixels corresponding to these coordinates. The read image data is displayed, so that the extracted image in FIG. 12 is displayed.

On the other hand, if it is determined that no rectangular shape 307 has been drawn (No in step T11), the CPU 4 determines whether or not the buttons 304 on the bars in the area 303 have been slid (moved) (see FIG. 11). If the user has moved the buttons 304 to positions as illustrated in FIG. 12, for example, through sliding operations, the CPU 4 displays, as the values 305, the upper and lower limit values out of the height threshold values which correspond to the positions to which they have been moved (see FIG. 12).

As described above, in setting height threshold values according to the point specification method, the user can make settings by performing sliding operations on the buttons 304 on the bars. Also, the user can set desired height threshold values, by drawing a rectangular shape 307 in the display area 301 for automatically sliding and moving the buttons 304 according to the upper and lower limit values detected in the area in the rectangular shape 307. Further, both the methods can be employed in combination with each other for making settings.

(Static Plane Specification Method)

Figure 15:
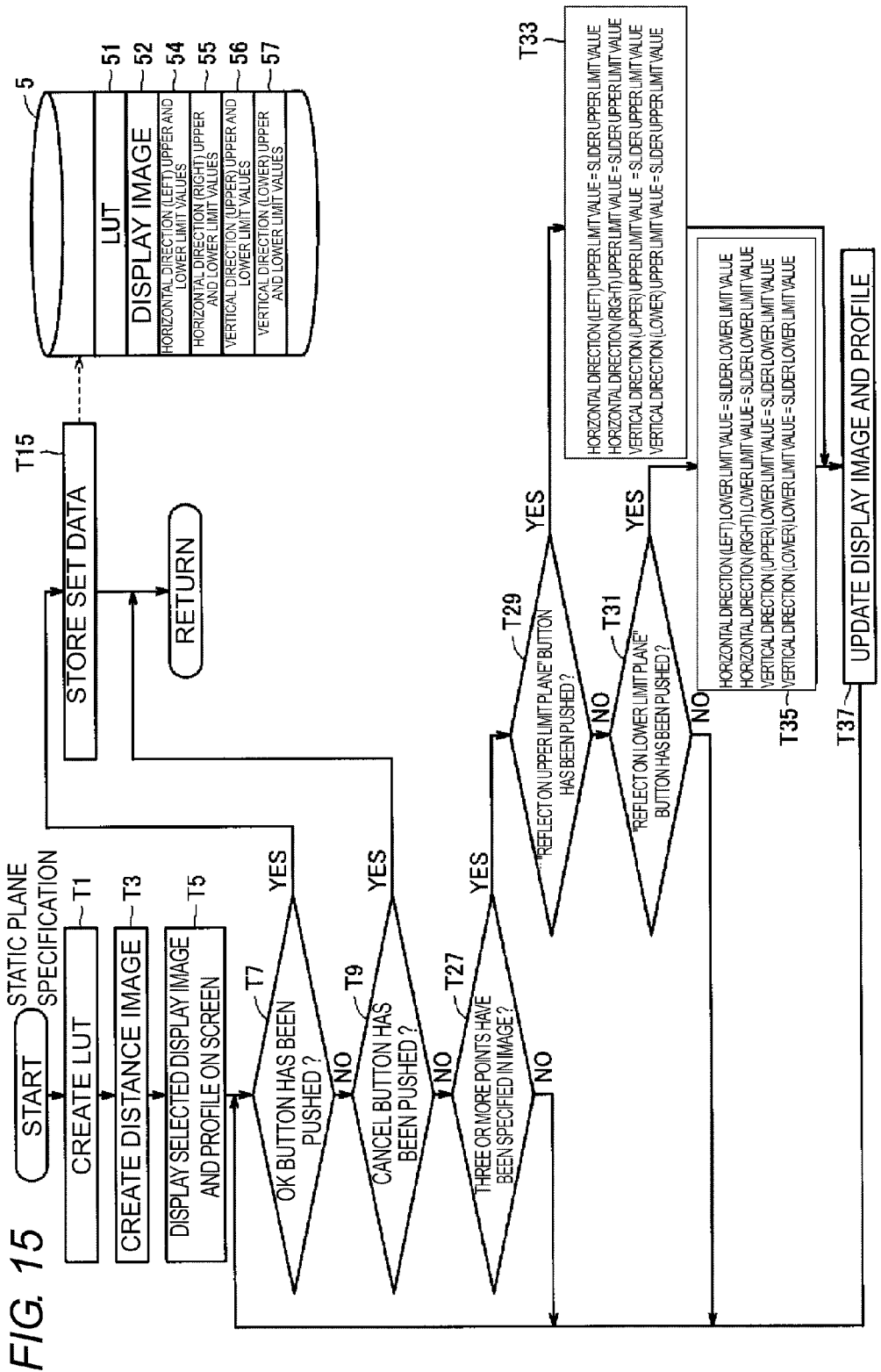
FIG. 15 is a processing flow chart for parameter setting according to a static plane specification method according to the present embodiment.

There will be described the static plane specification method with reference to exemplary displayed screens in FIG. 16 and FIG. 17, according to a flow chart in FIG. 15.

Figure 16:
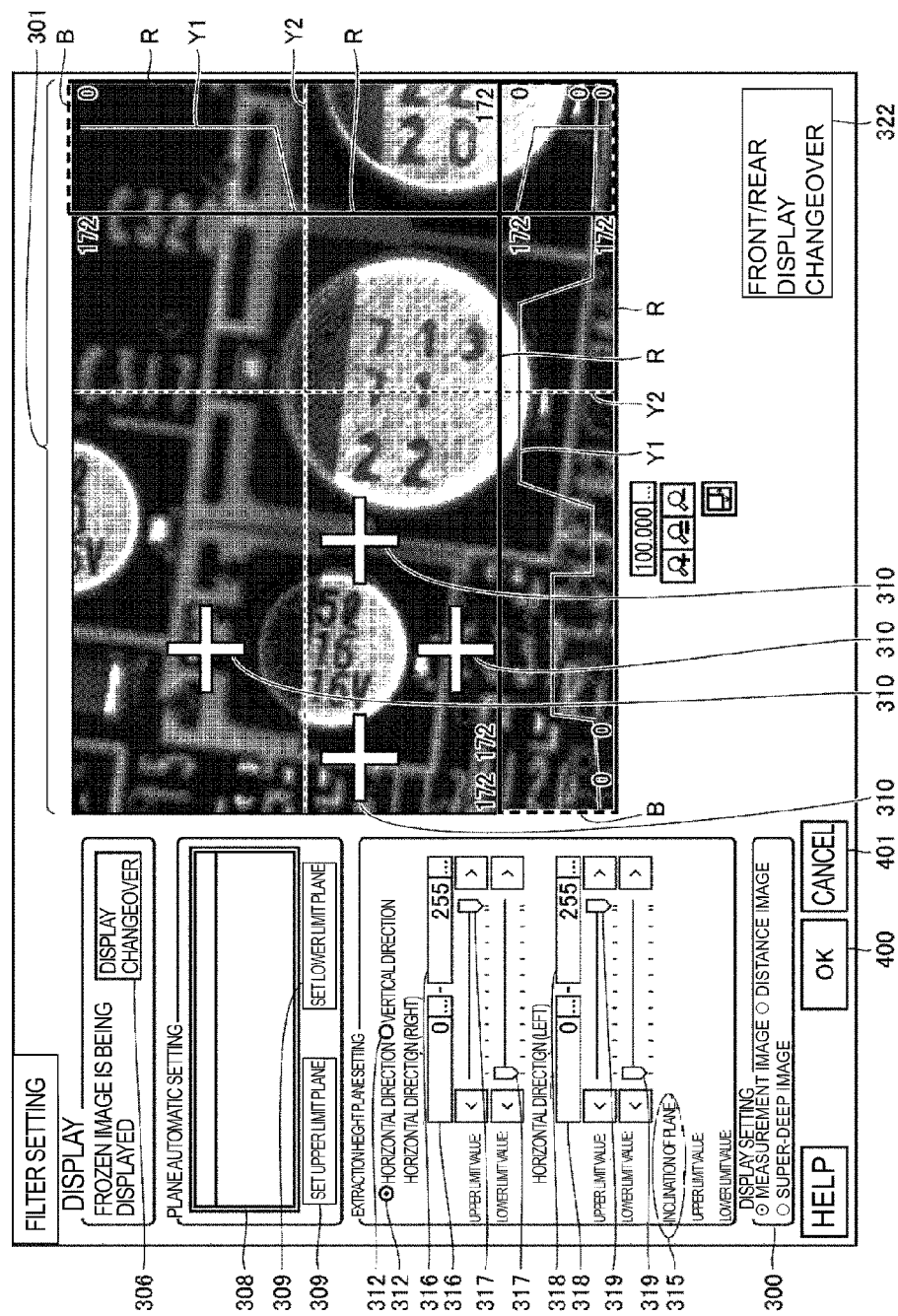
FIG. 16 is a view illustrating an exemplary screen displayed in the processing flow chart in FIG. 15.

In the screen in FIG. 16, in order to determine a plane parallel with a reference plane for extracting an image based on height information, the user specifies points 310 at least at three positions in the image area 301, by operating the mouse 6B. It is necessary only that three or more points 310 are specified in order to define a plane, and if three or more points are specified, it is possible to freely add and eliminate them.

The CPU 4 detects the coordinates (X, Y) of the specified points 310 in the image area 301 and searches for data of a distance image corresponding to the image displayed in the image area 301 (the image selected in step33), based on the detected coordinates (X, Y). As a result of the searching, the values of the coordinates (X, Y, Z) corresponding to the specified points 310 can be read from the distance image data. The CPU 4 displays the values of the coordinates (X, Y, Z) corresponding to the respective specified points 310, in a coordinate display area 308 in the display portion 3.

After specifying the points 301, if the user clicks a "Plane Setting" tab 309 for selecting this, the CPU 4 creates a plane passing through all the specified points 310. In this case, if the CPU 4 detects that the user has selected the "Plane Setting" tab 309 for "Upper Limit Plane", the CPU 4 updates the plane information about the upper limit plane, using information about the created plane. If the CPU 4 detects that the user has selected the "Plane Setting" tab 309 for "Lower Limit Plane", the CPU 4 updates the plane information about the lower limit plane, using information about the created plane. In FIG. 16, the heights of the upper and lower limit planes have not been specified yet and, therefore, the red solid lines R indicating the heights of the upper and lower limit planes are displayed to be superimposed on the blue broken lines B indicating the scale values.

After the heights of planes are specified based on the values in the coordinate display area 306, according to the plane information about the lower limit plane and the upper limit plane, as described above, the screen is updated as in FIG. 17. Referring to FIG. 17, based on the specified height values of the upper and lower limit plane, with respect to the upper and lower limit planes extending in the horizontal direction, the CPU 4 calculates the heights of these planes at the left and right ends of the screen and the inclinations of these planes, when they are viewed in the direction toward the screen. Further, the CPU 4 displays the calculated values as data of information 316, 317, 318 and 315. Similarly, with respect to the upper and lower limit planes extending in the vertical direction, the CPU 4 calculates the heights of these planes at the upper and lower ends of the screen and the inclinations of these planes. Further, the CPU 4 displays the calculated values as data of information 316, 317, 318 and 315.

Figure 17:
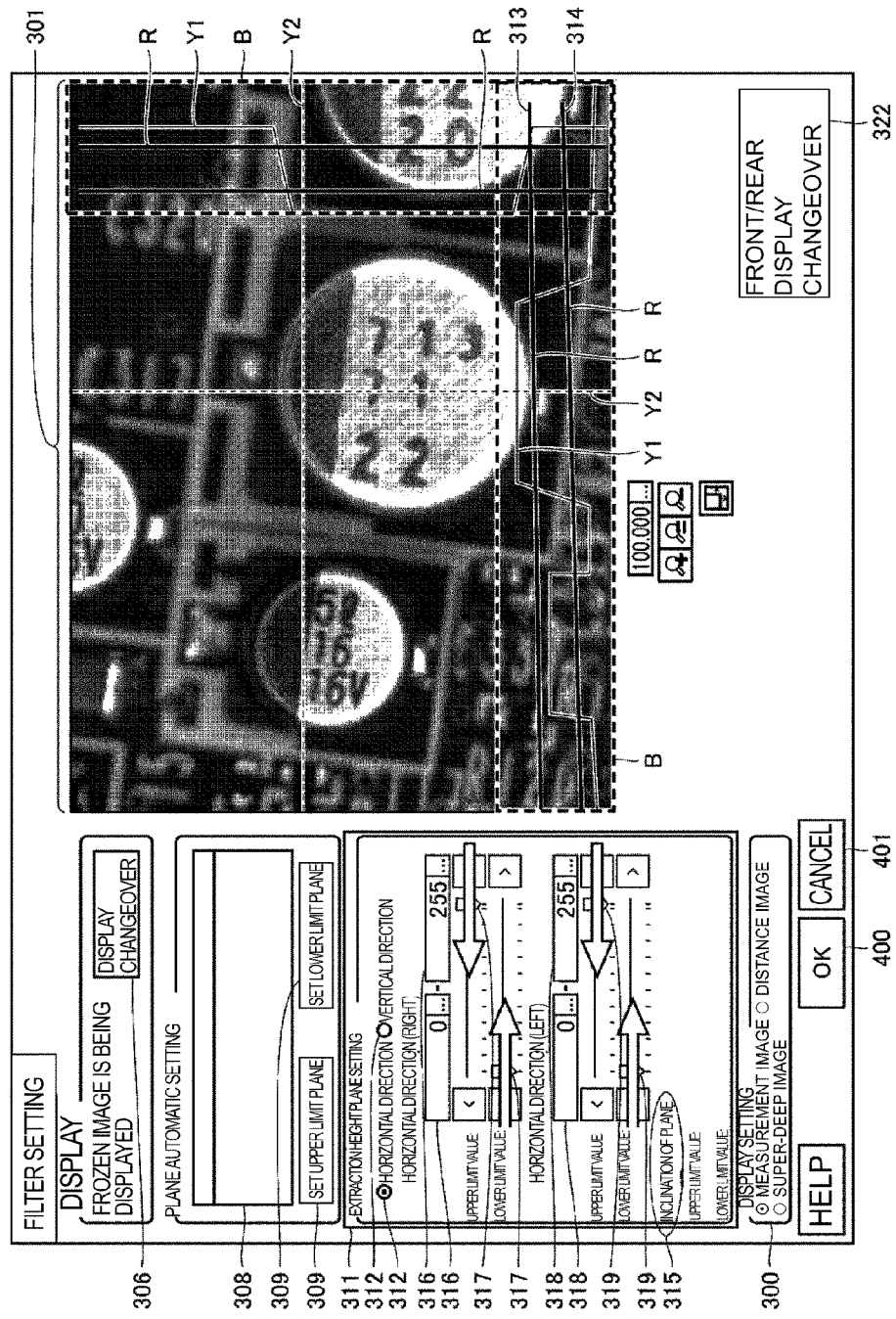
FIG. 17 is a view illustrating another exemplary screen displayed in the processing flow chart in FIG. 15.

In FIG. 17, it is possible to selectively change over the display of information in the "Plane Information" area 311, between the display of information about upper and lower limit planes extending in the horizontal direction and the display of information about upper and lower limit planes extending in the vertical direction. In FIG. 17, "Horizontal Direction" has been specified in a box 312 and, therefore, the information 316, 317, 318 and 315 about upper and lower limit planes extending in the horizontal direction are displayed in the "Plane Information" area 311.

Further, by performing operations for sliding buttons 317 and 319 on bars through operations on the key board 6A or the mouse 6B, the user can variably adjust the height values in the information 316 and 318 in the "Plane Information" area 311 to corresponding values in conjunction with the sliding operation. In the image area 301, the red solid lines R are drawn at the heights of the upper limit plane 313 and the lower limit plane 314, in the horizontal direction and the vertical direction, in conjunction with the settings of values in the "Plane Information" area 311.

There will be described the procedures for setting parameters according to "the static plane specification method" described with reference to the screens in FIG. 16 and FIG. 17, with reference to the flow chart in FIG. 15.

In step T1 to T5, the CPU 4 creates an LUT, creates a distance image and displays a selected display image and a profile in the image area 301 in the display portion 3, in the same manner as described above.

The CPU 4 determines whether or not the "OK" button 400 or the "Cancel" button 401 has been operated (step T7 and step T9). If the CPU 4 determines that any of the buttons has not been operated, the CPU 4 determines whether or not three or more points 310 have been specified in the image area 301 (step T27). If it is determined that three or more points have not been specified (No in step T27), the processing returns to the processing in step T7.

If the CPU 4 determines that three or more points have been specified (Yes in step T27), the CPU 4 determines whether or not the "Plane Setting" tab 309 for "Set Upper Limit Plane" has been operated by the user (step T29). If the CPU 4 determines that it has not been operated (No in step T29), the processing shifts to step T31.

If the CPU 4 determines that the "Plane Setting" tab 309 for "Set Upper Limit Plane" has been operated (Yes in step T29), in step T33, the values of the information 316 and 318 about the horizontal direction (left) and (right) and the vertical direction (upper) and (lower) for the upper limit plane in the "Plane Information" area 311 are updated to the values indicated by the positions of the buttons 317 and 319 on the bars. Thereafter, the processing shifts to step T37.

If the CPU 4 determines that the "Plane Setting" tab 309 for "Set Lower Limit Plane" has been operated (Yes in step T31), in step T35, the values of the information 316 and 318 about the horizontal direction (left) and (right) and the vertical direction (upper) and (lower) for the lower limit plane in the "Plane Information" area 311 are updated to the values indicated by the positions of the buttons 317 and 319 on the bars. Thereafter, the processing shifts to step T37.

In step37, the CPU 4 displays the information 316, 317, 318 and 319 in the "Plane Information" area 311 using the values updated in step T33 and T35 and, also, draws red solid lines 313 and 314 indicating the heights and the inclinations of the upper limit plane and the lower limit plane in the "Plane Information" area 311. Further, the CPU 4 performs "Image Extraction" of image data having height information corresponding to the height threshold values of the upper and lower limit planes, from the image data specified in step33 and, then, displays the extracted image in the image area 301.

In this case, "Image Extraction" refers to searching a distance image, further detecting the coordinates (X, Y, Z) of the pixels having Z coordinate values corresponding to between the planes (the upper limit and the lower limit) having the height information indicated by the information 316, 317, 318 and 319 in the "Plane Information" area 311, further searching the data of the display image selected in step33 based on the detected coordinates, and reading only image data constituted only by the pixels corresponding to these coordinates. Since the read image data is displayed, so that the extracted image is displayed in the image area 301.

If it is determined that the "OK" button 400 has been operated (Yes in step T7), processing for storing the set data is performed (step T15). At this time, the secondary storage portion 5 has stored information including the LUT data 51, the data 52 of the display image in the image area 301, the height data 54 of the left ends of the upper and lower limit planes in the horizontal direction, the height data 55 of the right ends of the same, and the height data 54 and 57 of the upper and lower ends of the upper and lower limit planes in the vertical direction.

(The Dynamic Plane Specification Method)

Next, there will be described the dynamic plane specification method with reference to displayed screens in FIG. 19 and FIG. 20, according to a flow chart in FIG. 18.

Figure 19:
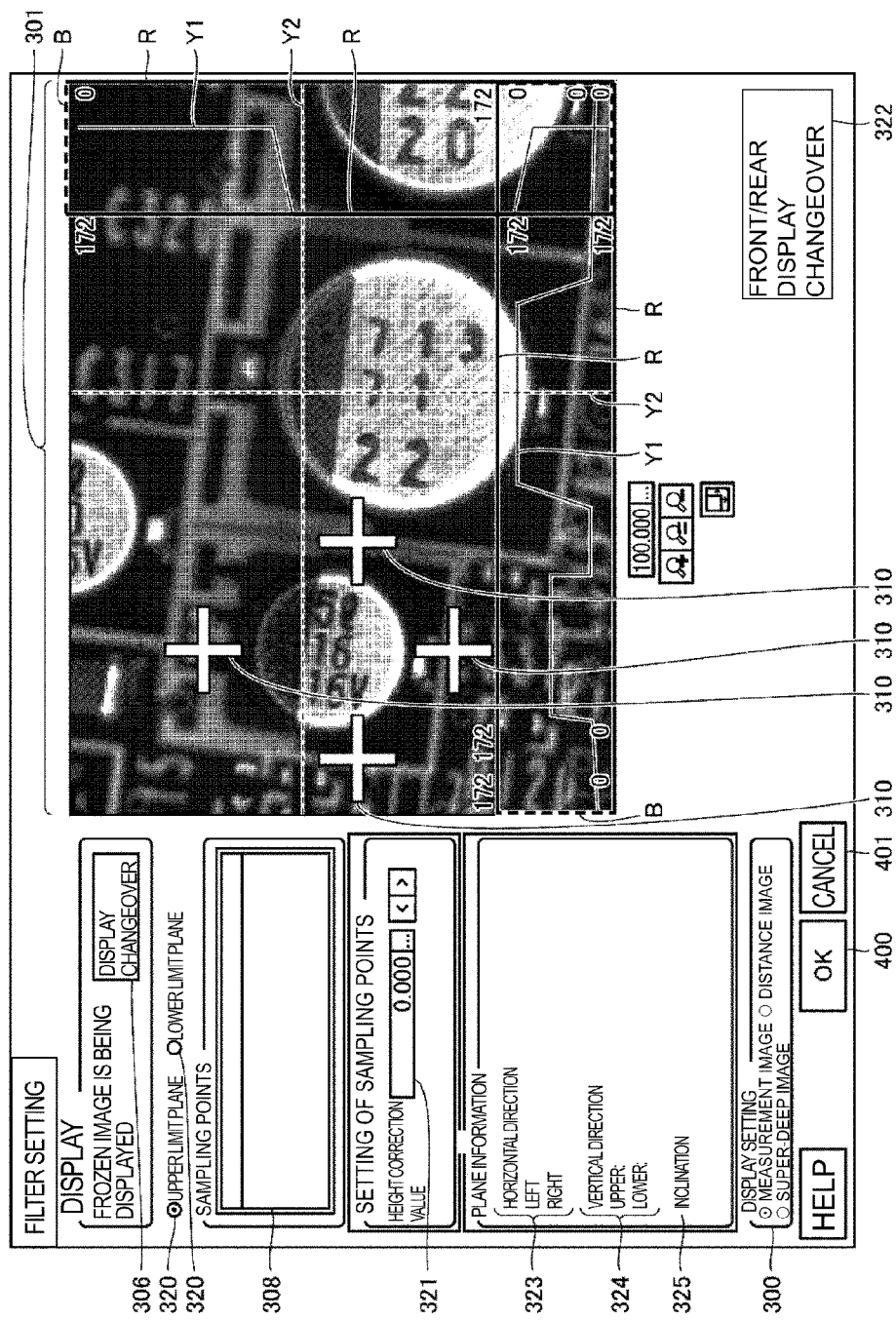
FIG. 19 is a view illustrating an exemplary screen displayed in the processing flow chart in FIG. 18.

Referring to FIG. 19, the user performs an operation for specifying at least three points 310, in order to determine a plane for image extraction having a height threshold value, while referring to the image in the image area 301. In this case, if three or more points 310 are specified, it is possible to freely add and eliminate points 310. With the specified three or more points 310, it is possible to uniquely determine a plane for image extraction which passes through the pixels having the coordinates at these points 310.

After specifying the points 310 for specifying a plane, the user clicks "Upper Limit Plane" or "Lower Limit Plane" in the "Plane Selection" tab 320, in order to set the specified plane as an upper limit plane or a lower limit plane, by operating the mouse 6B. Thus, it is possible to set the specified plane as an upper limit plane or a lower limit plane.

The CPU 4 detects the coordinate positions corresponding to the respective points 301 specified by the user, further detects the values of the coordinates (X, Y, Z) of the corresponding pixels from a distance image, and displays the detected values of the coordinates (X, Y, Z) in the "Coordinate Display" area 308.

If the user desires to correct the values of the heights at the sampling (specified) points 310 when checking the values displayed in the "Coordinate Display" area 308, the user inputs an offset value for correction to an "Offset Setting" area 321, by operating the key board 6A. More specifically, the offset value can be specified as ±α.

Based on the respective values of the coordinates (X, Y, Z) of the specified points 310, the CPU 4 creates a plane defined by these coordinates (X, Y, Z), further calculates the heights of the created plane in the horizontal direction (the heights thereof at the left end and the right end of the screen), the heights thereof in the vertical direction (the heights thereof at the upper end and the lower end of the screen), and the inclination thereof, and displays the calculated values as information 323, 324 and 325.

In this case, when the user has specified an offset value in the "Offset Setting" area 321, the CPU 4 recalculates the values of the information 323, 324 and 325 and displays the recalculated values, based on the respective coordinates (X, Y, Z) of the specified points 310 and the offset value specified in the "Offset Setting" area 321.

If the user operates the "Front/Rear Display Changeover" tab 322, the CPU 4 performs "Image Extraction" for an image having height information indicating heights equal to or less than the height information about the upper limit plane but equal to the height of the lower limit plane, based on the height extraction planes (the upper limit plane and the lower limit plane) set by the information 323 and 324. Further, the CPU 4 displays the extracted image in the image area 301 as illustrated in FIG. 20.

In this case "Image Extraction" refers to searching a distance image, further detecting the coordinates (X, Y, Z) of the pixels having Z coordinate values corresponding to between the planes (the upper limit and the lower limit) having the height information indicated by the information 323 and 324, further searching the data of the display image selected in step33 based on the detected coordinates, and reading, from the data of the display image, only image data constituted only by the pixels having coordinates (X, Y) corresponding to these coordinates. Since the read image data is displayed, so that the extracted image as illustrated in FIG. 20 is displayed in the image area 301.

With reference to the flow chart in FIG. 18, there will be described the dynamic plane specification method described with reference to FIG. 19 and FIG. 20.

The CPU 4 creates an LUT, further creates a distance image and displays a display image and a profile in the image area 301 (steps T1 to T5). Subsequently, the CPU 4 determines whether or not the "OK" button 400 or the "Cancel" button 401 has been operated (step T7 and step T9). If it is determined that any of them has been operated, the set data is stored (step T15) or the continuous processing ends.

If the CPU 4 determines, in step T7 and step T9, that any of the "OK" button 400 and the "Cancel" button 401 has not been operated, the CPU 4 determines, in step T39, whether or not the plane to be set by the user has been changed from the upper limit plane to the lower limit plane or from the lower limit plane to the upper limit plane, based on the inputting operations performed on the "Plane Selection" tab 320. If the CPU 4 determines that such a change has been performed (Yes in step T39), the CPU 4 changes the set values for the plane (the upper limit plane or the lower limit plane) on which this change should be reflected, using the coordinates of the points 310 as sampling points, and the correction value inputted in the "Offset Setting" area 321 (step T43). These set values include the values of the coordinates (X, Y, Z) of the sampling points indicated by the points 310 for the upper limit plane (or the lower limit plane) and the height correction value. Thereafter, the processing shifts to step T41.

If it is determined that the plane to be set is not changed (No in step T39), it is determined whether or not three or more points 301 have been specified in the image area 301, in step T41. If it is determined that three or more points 301 have not been specified (No in step T41), the processing returns to step T7.

If it is determined that three or more points 301 have been specified (Yes in step T41), the CPU 4 determines whether or not an offset value has been inputted in the "Offset Setting" area 321 (step T45). If it is determined that an offset value has been inputted (Yes in step T45), the set values specified by the information 323 and 324 are updated based on the offset value (step T47). Thereafter, the processing shifts to the processing in step T49.

Figure 20:
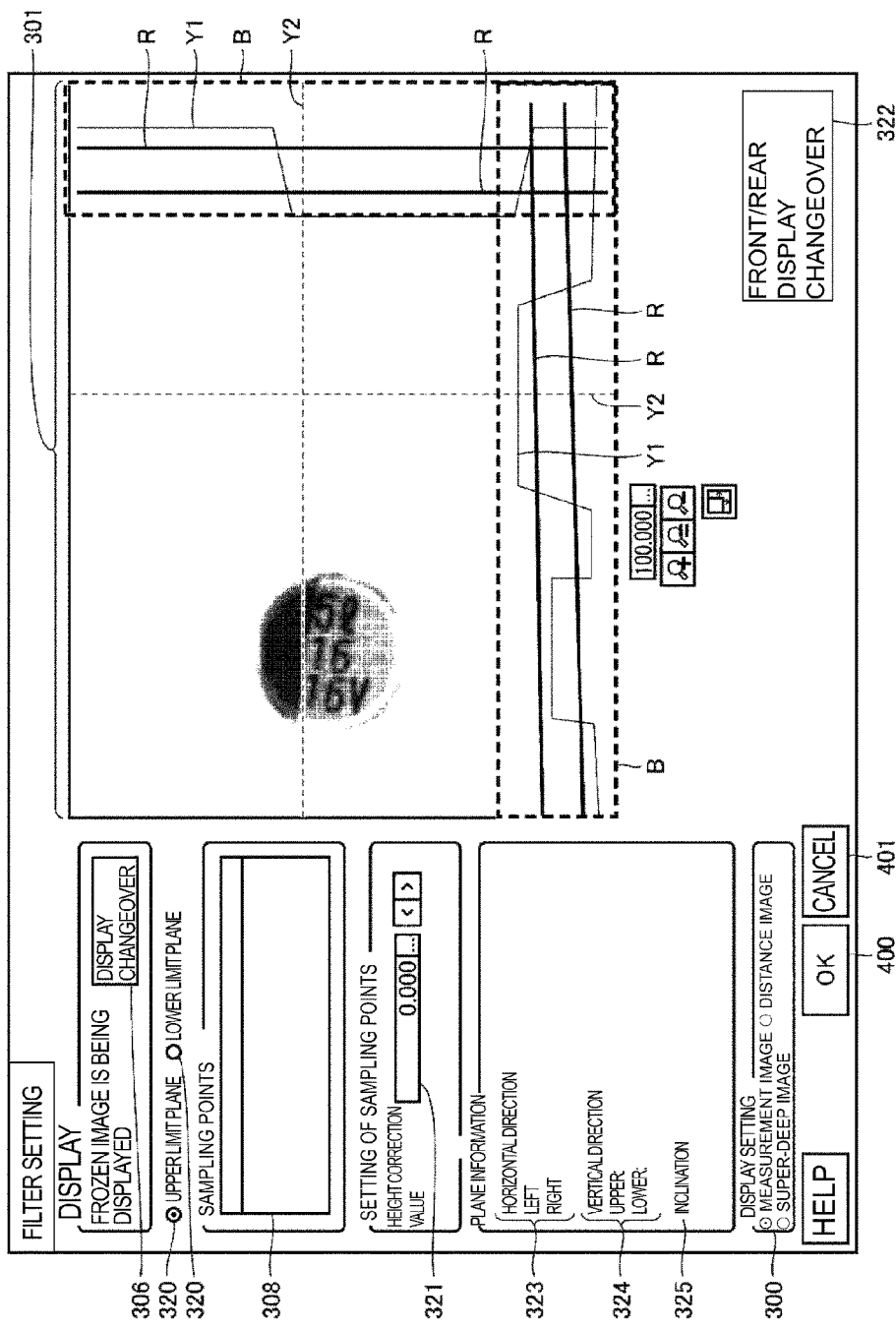
FIG. 20 is a view illustrating another exemplary screen displayed in the processing flow chart in FIG. 18.

In step T49, based on the set parameters (the values of the information 323 and 324), as illustrated in FIG. 20, the display of the red solid lines R indicative of the upper and lower limit planes 313 and 314, the display of the blue broken lines B indicative of the scale and the display of the yellow solid lines Y1 indicative of the profile are updated, in the image area 301. Further, "Image Extraction" is performed, and the extracted image is displayed (step T49). Thereafter, the processing returns to step T7.

Figure 18:
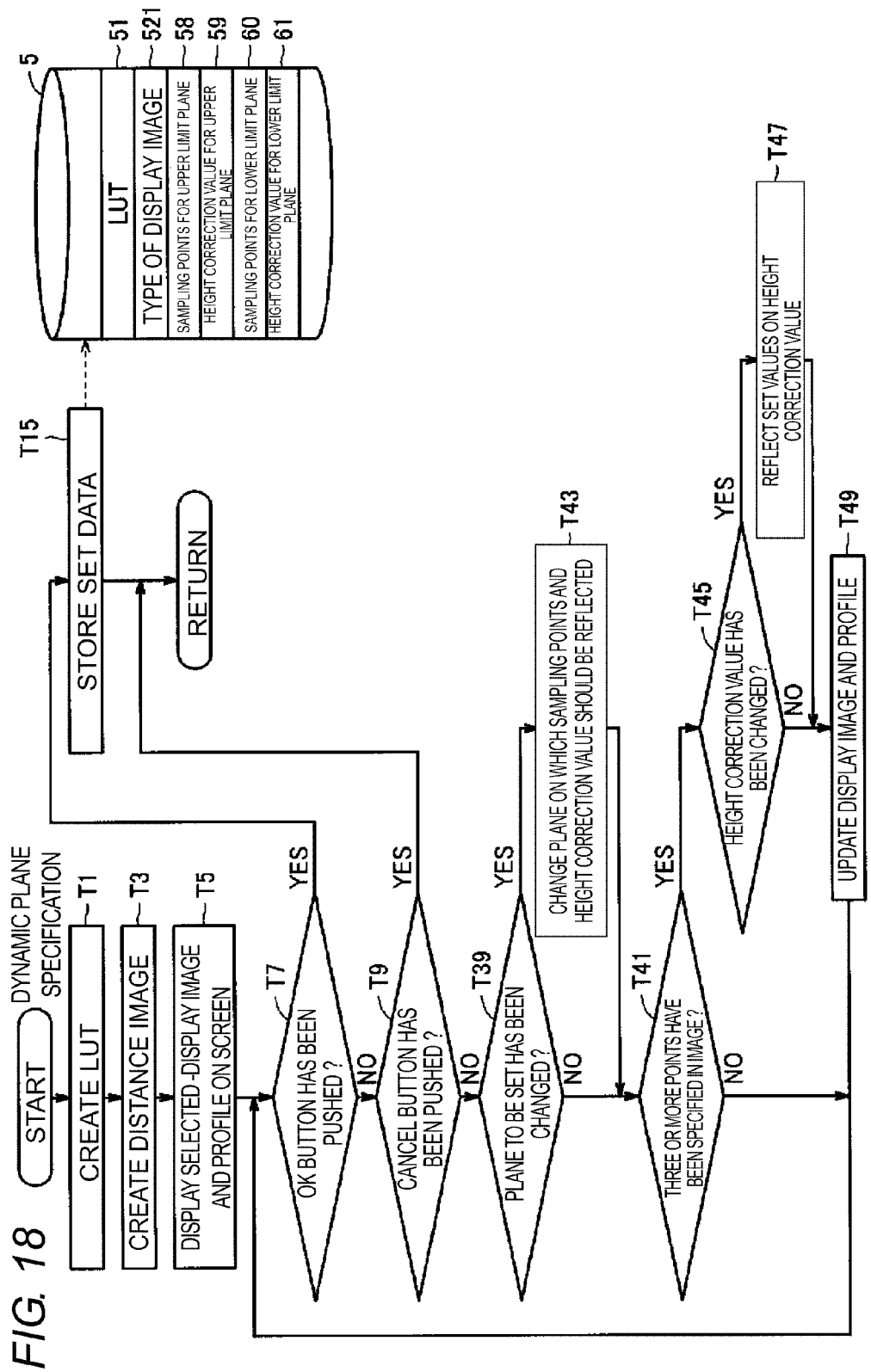
FIG. 18 is a processing flow chart for parameter setting according to a dynamic plane specification method according to the embodiment of the present invention.

If the "OK" button 400 is operated in step T6 in FIG. 18, the parameter data set by the user is stored in the secondary storage portion 5. At this time, the secondary storage portion 5 has stored information including the LUT data 51, the type 521 of the display image in the image area 301, the coordinate values 58 of the sampling points (the points 310) for the upper limit plane, the height correction value for the upper limit plane (the inputted value in the "Offset Setting" area 321) 59, the coordinate values 60 of the points 310 for the lower limit plane, and the height correction value for the lower limit plane (the inputted value in the "Offset Setting" area 321) 61.

(The Dynamic Curved-Plane Specification Method)

At first, the principle of the dynamic curved-plane specification in FIG. 23 will be described, in order to describe the "dynamic curved-plane specification method" with reference to a displayed screen in FIG. 22, according to a flow chart in FIG. 21.

With reference to FIG. 23, the CPU 4 performs binarization processing for setting, as white pixels, pixels at portions having tone values higher or lower than an average tone value of the pixels in the peripheral areas, while setting the other pixels as black pixels. Thus, the pixels having a higher degree of density variation than those of the peripheral pixels are extracted as white pixels. By combining the extracted white pixels with one another, it is possible to extract a plane constituted by portions (pixels) having larger brightness (density) variations. This extraction plane is referred to as a "dynamic curved plane". Such a dynamic curved plane schematically indicates the outer shape of a target object to be photographed.

In order to accurately extract a "dynamic curved plane", pixels having larger brightness variations are emphasized more strongly. In order to attain this, for example, the CPU 4 applies a filter 406 as illustrated in FIG. 23(C) to the tone values of a total of 9 pixels constituted by a certain center pixel of interest and the pixels positioned adjacent thereto in the upward, downward, leftward and rightward directions, in a distance image. The center (the diagonal-line portion) of the filter 406 is made coincident with the pixel of interest. The CPU 4 sums the tone values of the nine pixels and detects an average value based on the value resulted from the summation. The tone value of the pixel of interest is compared with the average value and, as a result of the comparison, if the tone value of the pixel of interest is higher than the average value, the tone value of this pixel of interest is replaced with the value of a while pixel. The filter 406 is applied to an input image while moving the pixel of interest therein, and the tone value of the pixel of interest is compared with the average of the tone values of the peripheral pixels. Thus, pixels having abrupt changes in height information (distance) (namely, pixels having a maximum value) are detected and are replaced with white pixels. The same is applied to cases where the tone value of the pixel of interest is lower than the average.

Figure 23A:
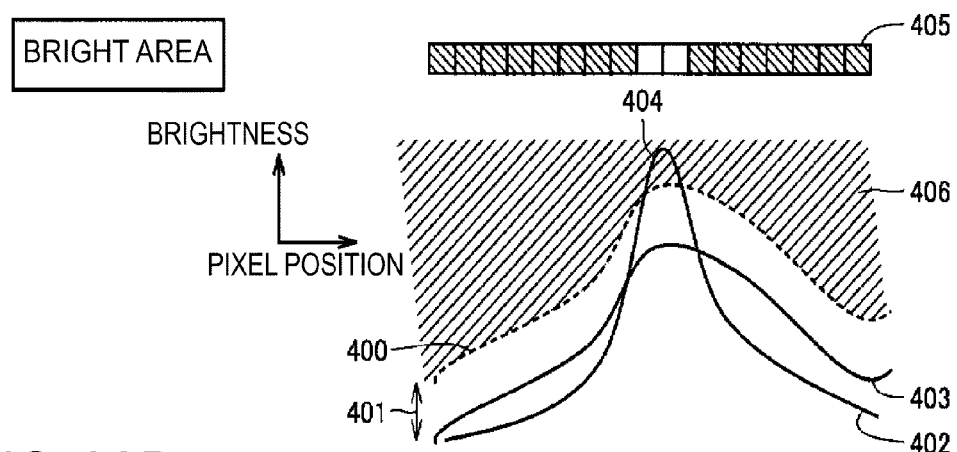
FIGS. 23 A to C are views illustrating the concept of the dynamic curved-plane specification according to the embodiment of the present invention.

In the case of extracting an area having a pixel of interest which has a tone value higher than the average value of the peripheral pixels, namely a bright area, as a dynamic curved plane, as illustrated in FIG. 23(A), a pixel 404 at a portion having a density value 402 higher than the average density value 403 of the peripheral pixels, out of the density values 402 indicating the tone values of respective portions of an input image, is extracted, and the extracted pixel 404 is replaced with a white pixel.

The user can adjust (update) the value of the density value 403 using an extraction offset value 401 for changing the position of the partial image corresponding to the extracted image 404 in the input image. The updated value of the density value 403 is set as an extraction threshold value 400. For example, "Image Extraction" is performed on an area having a tone value higher than the extraction threshold value 400. The coordinate values of the pixels having the same tone value as the extraction threshold value 400 are plotted, and the plotted points are connected to one another in a plane shape to create a dynamic curved plane as a free curved plane indicated by the red solid lines R in FIG. 22.

Figure 22:
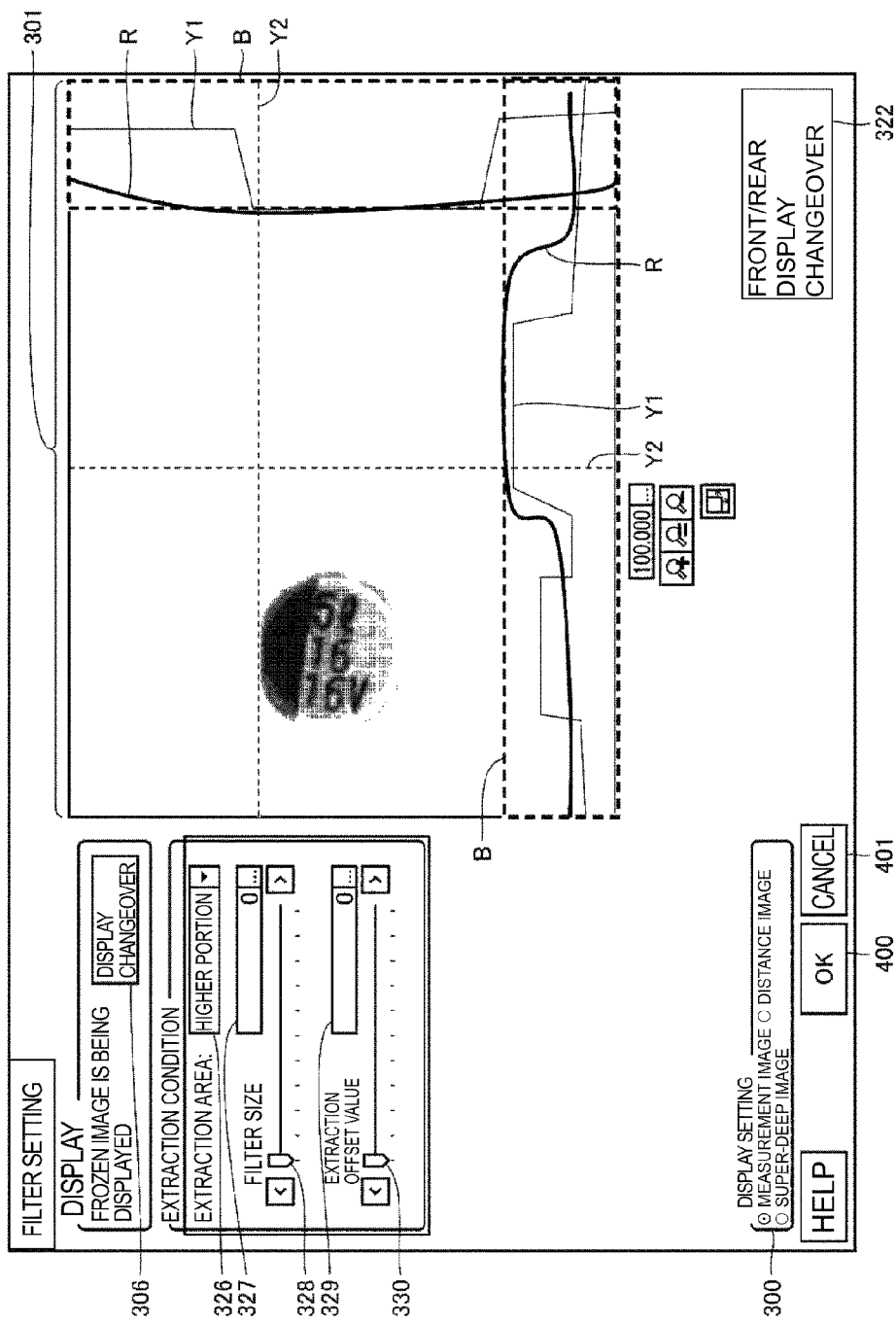
FIG. 22 is a view illustrating an exemplary screen displayed in the processing flow chart in FIG. 21.

Referring to the screen in FIG. 22, if the user desires to extract only an image in an area having height information indicating heights larger than those of the free curved plane of the solid lines R indicating the dynamic curved plane extracted according to the extraction condition (the filter size), the user inputs "Higher Portion" to the "Extraction Area" tab 326 by operating the key board 6A. On the contrary, if the user desires to extract an image having height information indicating heights smaller than those of the dynamic curved plane of the solid lines R, the user inputs "Lower Portion" to the "Extraction Area" tab 326.

In the present embodiment, it is possible to variably set the size of the filter 406, which is the condition for extraction of a dynamic curved plane. The user can variably set the filter size, by specifying the size in a "Filter Size" tab 327. The setting of the filter size can be made, by performing operations for sliding a button 328 on a bar which is provided with scale marks for the filter size, as well as by inputting a numerical value in the "Filter Size" tab 327. Further, an extraction offset value 401 can be variably inputted to an "Extraction Offset" tab 329. Instead of inputting a numerical value to the "Extraction Offset" tab 329, it is also possible to perform inputting by performing operations for sliding a button 330 on a bar provided with scale marks for the extraction offset value 401.

Figure 23B:
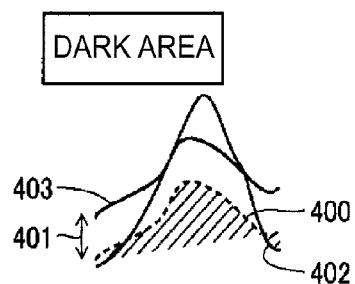
Figure 23C:
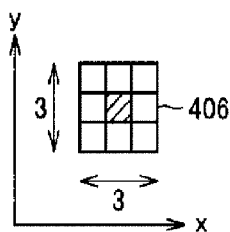

FIG. 23(B) illustrates a case of extracting an area having tone values lower than the extraction threshold value 400, namely a dark area. In order to provide the extraction condition in FIG. 23(B), it is possible to set "Lower Portion" in the "Extraction Area" tab 326 in FIG. 22.

(The Dynamic Curved-Plane Extraction Algorism and Extracted Image)

Figure 24:
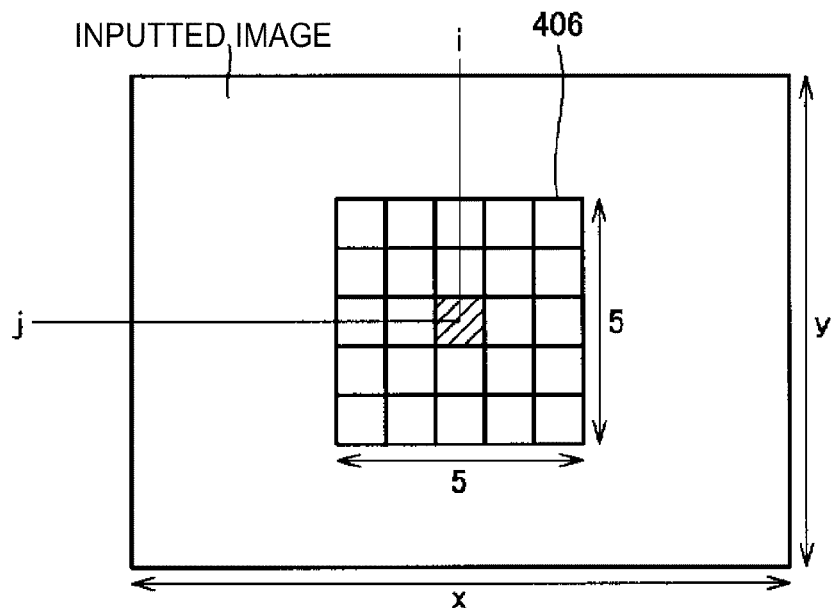
FIG. 24 is a view illustrating a filter which is applied to the algorism of the dynamic curved-plane specification according to an embodiment of the present invention.

The algorism for the aforementioned dynamic curved-plane extraction will be described. In order to specify a dynamic curved plane, all the pixels in an input image I (i, j) are set as an pixel of interest, and a filter 406 with a size of 5×5 in FIG. 24 is applied to a total of 25 pixels which are constituted by a pixel of interest and the peripheral pixels, such that the center (the diagonal-line portion) of the filter 406 is coincident with the pixel of interest. The CPU 4 detects the difference between the tone value of the pixel of interest and the tone values of the peripheral pixels, with respect to all the pixels in the input image (i, j), to calculate (create) a difference image DI (i, j) having detected differences assigned to the respective pixels in the input image (i, j).

$$DI(i, j) = I(i, j) - \frac{\sum_{l=-2}^{2}\sum_{k=-2}^{2} I(i+k, j+l)}{5 \times 5} \quad \text{(Equation 1)}$$

Further, in order to perform "Image Extraction" from the input image (i, j), the CPU 4 compares the difference at each pixel in the difference image DI (i, j) with an offset value "offset" corresponding to the extraction offset value 410. Further, based on the result of the comparison, the CPU 4 creates (calculates) an output image O (i, j) corresponding to the extracted image.

More specifically, when "Higher Portion" has been inputted to the "Extraction Area" tab 326, an output image O (i, j) is calculated based on the comparison equation (Equation 2).

When "Lower Portion" has been inputted to the "Extracted Area" tab 326, an output image O (i, j) is calculated based on the comparison equation (Equation 3).

$$DI(i,j) > \text{offset} \rightarrow O(i,j) = 255$$

$$DI(i,j) \leq \text{offset} \rightarrow O(i,j) = 0 \quad \text{(Equation 2)}$$

$$DI(i,j) < -\text{offset} \rightarrow O(i,j) = 255$$

$$DI(i,j) \geq -\text{offset} \rightarrow O(i,j) = 0 \quad \text{(Equation 3)}$$

With reference to the flow chart in FIG. 21, the processing flow chart for the dynamic curved-plane specification method will be described.

The CPU 4 creates an LUT, creates a distance image and displays a display image and a profile in the image area (steps T1 to T5). Subsequently, the CPU 4 determines whether or not the "OK" button 400 or the "Cancel" button 401 has been operated (step T7 and step T9). If it is determined that any of them has been operated, the set data is stored (step T15) or the continuous processing ends.

If the CPU 4 determines, in step T7 and step T9, that any of the "OK" button 400 and the "Cancel" button 401 has not been operated, the CPU 4 determines whether or not the user has changed the settings of the to-be-extracted area of the image, based on the data inputted in the "Extracted Area" tab 326 (step T53). If the CPU 4 detects that the settings have been changed (Yes in step T53), the set area is set as an area to be extracted (step T59). Thereafter, the processing shifts to step T65 which will be described later.

If it is detected that the settings have not been changed (No in step T53), it is determined whether or not the user has changed the filter size, in the "Filter Size" tab 327 (step T55). If it is detected that the filter size has been changed (Yes in step T55), the set filter size is set as a to-be-used size of the filter 406 (step T61). Thereafter, the processing shifts to step T65 which will be described later.

If it is detected that the setting of the filter size has not been changed (No in step T55), it is determined whether or not the user has changed the extraction offset value 401 in the "Extraction Offset" tab 329 (step T57). If it is detected that the extraction offset value has been changed (Yes in step T57), the set extraction offset value is set as the offset value 401 to be used for image extraction as illustrated in FIG. 23 (step T63). Thereafter, the processing shifts to step T65 which will be described later.

In step T65, based on the set parameters, as illustrated in FIG. 22, the display of the red solid lines R indicative of the dynamic curved plane, the display of the blue broken lines B indicative of the scale, and the display of the yellow solid lines Y1 indicative of the profile are updated, in the image area 301. Further, "Image Extraction" is performed, based on the values set by the user in the "Extraction Area" tab 326, the "Filter Size" tab 327 and the "Extraction Offset" tab 329 and based on the aforementioned equation, and the extracted image is displayed (step T65). Thereafter, the processing returns to step T7.

Figure 21:
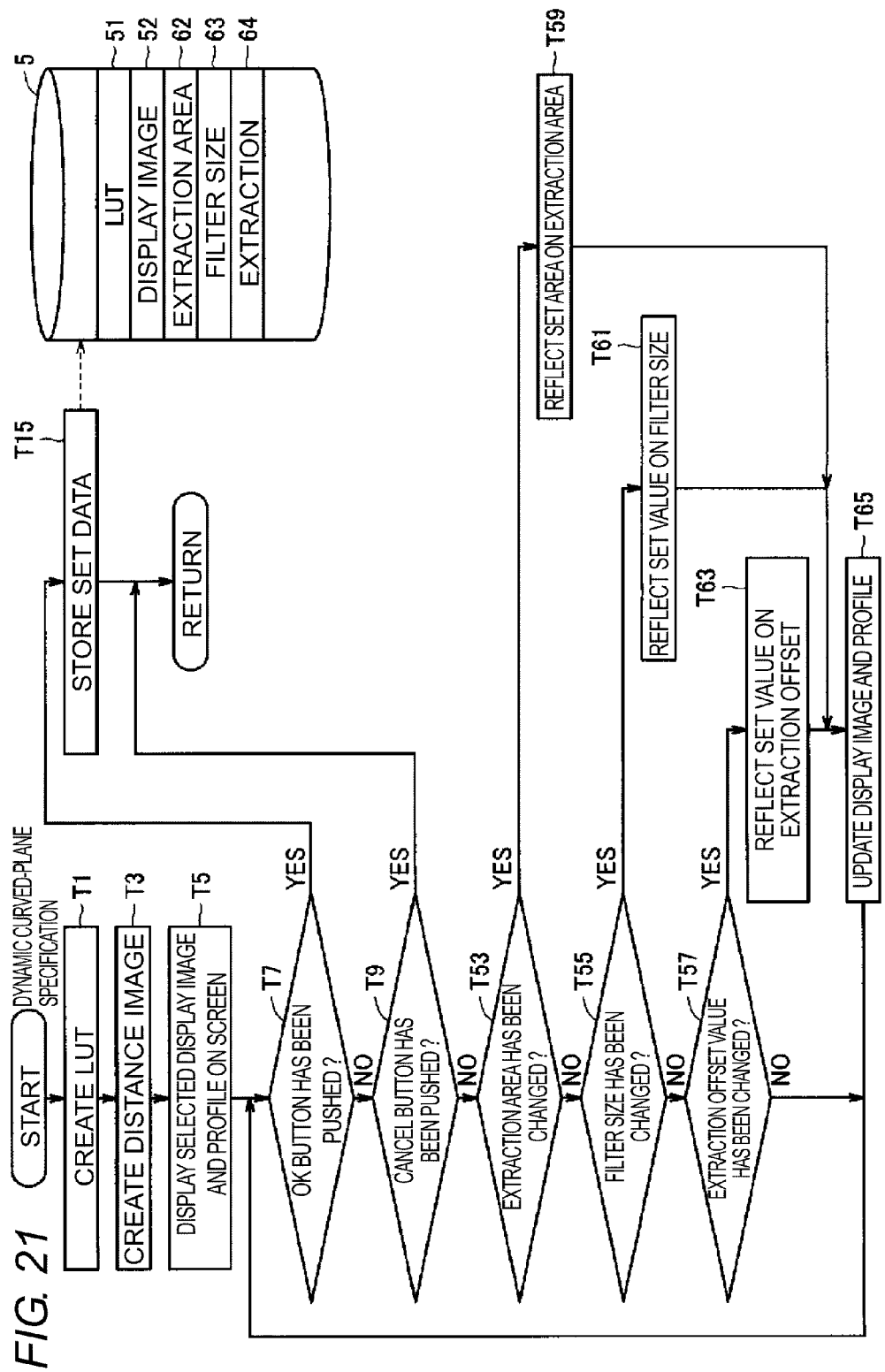
FIG. 21 is a processing flow chart for parameter setting according to a dynamic curved-plane specification method according to the embodiment of the present invention.

If the "OK" button 400 is operated in step T7 in FIG. 21 (Yes in step T7), the parameter data set by the user is stored in the secondary storage portion 5. At this time, the secondary storage portion 5 has stored information including the LUT data 51, the data 52 of the display image in the image area 301, the data 62 which specifies the extraction area, the data 63 of the size of the filter 406, and the data 64 indicating the extraction offset 401.

Although the aforementioned respective height threshold-value specification methods are adapted to actually photograph works 14 through the photographing portion 18 and create a distance image based on the created image data (refer to step T3), the acquisition path is not limited thereto. Namely, in step T3, data of a preliminarily-prepared distance image can be acquired by inputting it from a network or a CD-ROM 12 through the external I/F 10 or the reading portion 11 or by temporarily storing the data in the secondary storage portion 5 and then reading it from the secondary storage portion 5.

(Driving Processing)

Figure 25:
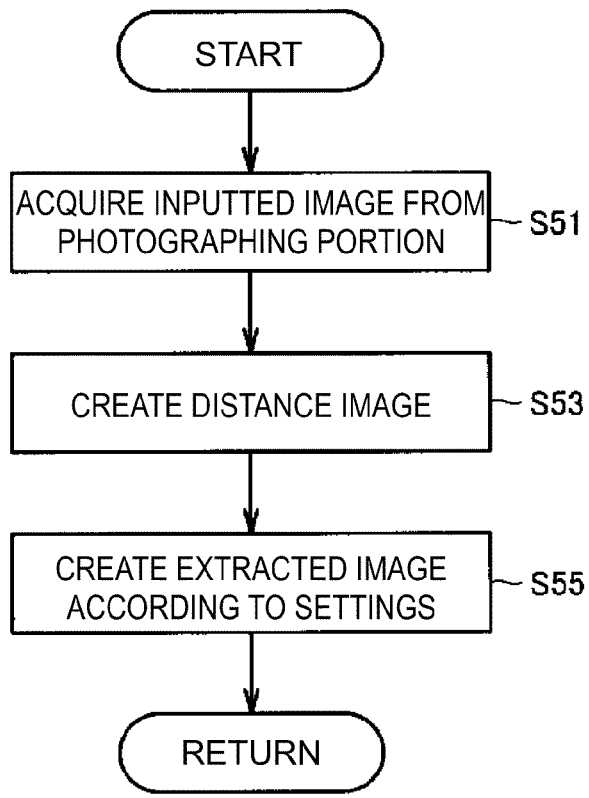
FIG. 25 is a flow chart of driving processing according to an embodiment of the present invention.
Figure 26:
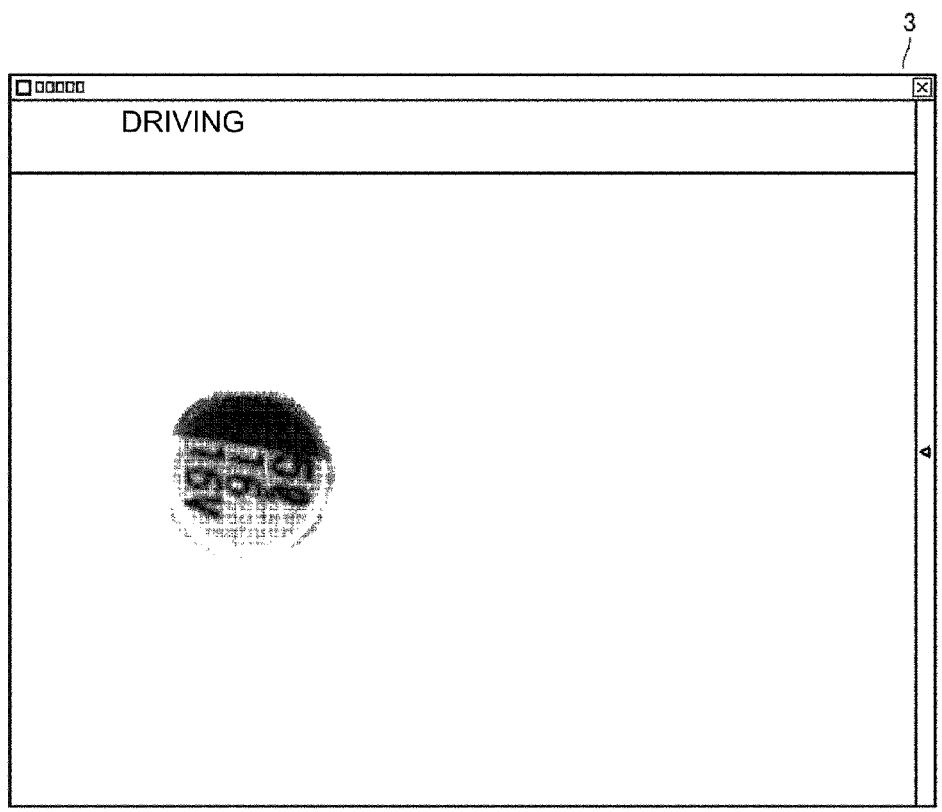
FIG. 26 is a view illustrating an exemplary screen displayed in the processing flow chart in FIG. 25.

If parameter values are stored in the secondary storage portion 5 according to the aforementioned height threshold-value specification methods, the CPU 4 performs processing in the driving mode for inspecting work defects using the parameter value of the secondary storage portion 5 (step S5). The processing in the driving mode will be described, with reference to a driving screen in FIG. 26 which is displayed in the display portion 3, according to a flow chart in FIG. 25.

At first, in the event of transition to the driving mode according to a command inputted from the outside, the CPU 4 reads the parameter values stored in the secondary storage portion 5 and stores the values in the main storage portion 8.

Subsequently, the CPU 4 causes the first camera portion 2A in the photographing portion 18 to photograph pallets 14 being transferred through the conveyer 16. An input image which is an image created by photographing by the first camera portion 2A is stored in the main storage portion 8 (step S51).

Further, the second camera portion 2B is caused to photograph the pallets 14, and a parallax image which is an image created by the photographing is outputted therefrom. The CPU 4 detects the height information about the respective pixels based on the parallax image, and creates (detects) a distance image (a density image) based on the detected height information and the LUT read from the main storage portion 8 (step S53). The distance image is stored in the main storage portion 8.

Subsequently, the CPU 4 reads, from the main storage portion 8, the values of the set parameters according to the "Height Threshold-Value Specification Method" preliminarily specified by the user. Further, the CPU 4 performs processing for the aforementioned "Image Extraction" according to this specified method, from the input image, based on the height threshold values indicated by the read parameter values. Through this processing, an extracted image is detected and is stored in the main storage portion 8 (step S55). The extracted image is displayed in the display portion 3 (see FIG. 26). In this case, similarly, the color of the display of the background for the extracted image can be changed, such that the user can easily check the extracted image.

(Defect Inspection)

The CPU 4 performs defect inspection processing (step7 in FIG. 4), using the extracted image detected according to the aforementioned procedures. It is possible to employ, for defect inspections, well-known procedures such as pattern matching between model images and extracted images and, therefore, the defect inspections will not be described in detail.

It should be understood that the embodiments disclosed herein are merely illustrative in all respects and not restrictive. The scope of the present invention is defined by the claims, not by the aforementioned description, and is intended to cover equivalent meanings to the claims and all changes which fall within the claims.

What is claimed is:

1. An image processing apparatus comprising one or more computers comprising:

a display portion;

a height input portion configured to input height information about an object to be photographed, the height information indicating the heights of the object in correspondence with respective portions of a corresponding image of the object, and being in association with respective tone values of a corresponding image in correspondence with these portions, a setting portion configured to set data for image processing in a setting mode; and a driving processing portion configured to receive an input image and processes the input image based on data which has been preliminarily set by the setting portion;

wherein the setting portion comprises:

a set-image display portion configured to display, on the display portion, a first image acquired by photographing the object in the setting mode, a threshold-value reception portion configured to receive threshold-value data about the height, according to inputs from the outside, the threshold-value reception portion comprising a density-plane creation portion configured to detect portions of the first image which have a larger tone value compared to an average tone value in the peripheral area, based on the tone values of the respective portions and the inputs from the outside and, further, to create a curved plane passing through the detected portions, and further comprising a plane threshold-value reception portion configured to receive the threshold-value data based on the height information corresponding to the portions through which the curved plane passes, and a first detection portion configured to detect, from the first image, a first partial image having only height information larger or smaller than height information of the curved plane specified by the threshold-value data, based on the height information inputted by the height input portion in the setting mode, and based on the threshold-value data received by the threshold-value reception portion, and the driving processing portion comprises a driving-image display portion configured to receive a second image acquired by photographing the object in the driving mode and configured to display it on the display portion, and a second detection portion configured to detect, from the second image, a second partial image having only height information larger or smaller than height information of the curved plane specified by the threshold-value data, based on the height information inputted by the height input portion in the driving mode, and based on the threshold-value data received by the threshold-value reception portion in the setting mode.

2. The image processing apparatus according to claim 1, wherein the setting portion is configured to display the first partial image detected by the first detection portion on a screen of the display portion in the setting mode, such that the background image for the first partial image on the screen is displayed in a predetermined color.

3. The image processing apparatus according to claim 1, wherein the setting portion further comprises a cross-sectional shape display portion configured to detect the height information about the portion of the first image which corresponds to a specified position therein, based on the height information inputted by the height input portion in the setting mode and to display, along with the first image, a first line indicative of the cross-sectional shape of the object which corresponds to this specified position, based on the detected height information.

4. The image processing apparatus according to claim 3, wherein the first image corresponds to a plane with two-dimensional coordinates which is defined by a first axis and a second axis orthogonal to each other, and the specified position is specified by the coordinates through which second lines parallel with the first axis and the second axis are passed.

5. The image processing apparatus according to claim 3, wherein a third line indicating height information indicated by the threshold-value data received by the threshold-value reception portion is displayed along with the first image, in association with the first line.

6. The image processing apparatus according to claim 1, wherein the inputs from the outside include an area specification input which specifies an area in the first image displayed by the set-image display portion, and the height threshold-value data is specified by the height information about the portion corresponding to the specified area, out of the height information inputted by the height input portion.

7. The image processing apparatus according to claim 1, wherein the inputs from the outside include a point specification input which specifies plural points in the first image displayed by the set-image display portion, and the height threshold-value data is specified by the height of a plane passing through the portions corresponding to the specified plural points, out of the height information inputted by the height input portion.

8. The image processing apparatus according to claim 7, wherein the plane comprises an upper limit plane and a lower limit plane corresponding to an upper limit and a lower limit of the threshold data, the plural points include specified points for the upper limit plane and the lower limit planes, the height threshold-value data is specified by the height information about the upper limit plane and the lower limit plane, and the second detection portion is configured to detect the second partial image having the height information which is equal to or less than the height information about the upper limit plane but is equal to or more than the height information about the lower limit plane, based on the height information inputted by the height input portion, and based on the height information about the upper limit plane and the lower limit plane which is specified by the threshold-value data received by the threshold-value reception portion in the setting mode.

9. The image processing apparatus according to claim 8, wherein the height information about the upper limit plane and the lower limit plane can be changed according to inputs from the outside.

10. The image processing apparatus according to claim 1, wherein the threshold-value data received by the plane threshold-value reception portion indicates the height information corresponding to the portions through which the curved plane passes after it has been updated based on an offset value.

11. The image processing apparatus according to claim 10, wherein the offset value can be changed according to inputs from the outside.

12. The image processing apparatus according to claim 1, wherein the size of the peripheral area can be changed according to inputs from the outside.

13. An image processing method comprising the following steps using one or more computers:
 a setting step for setting data for image processing in a setting mode; and
 a driving processing step for receiving an input image and processing the input image based on data set in the setting step;
wherein the setting step comprises:
 a set-image display step for displaying a first image acquired by photographing an object in the setting mode, and
 a threshold-value reception step for receiving threshold-value data about the height, according to inputs from the outside, the height information about the object indicating the heights of the object in correspondence with respective portions of an image of the object and being in association with respective tone values of a corresponding image in correspondence with these portions,
the threshold-value reception steps comprising:
 a density-plane creation step for detecting portions of the first image which have a larger tone value compared to an average value in the peripheral area based on the tone values of the respective portions and the inputs from the outside and, further, for creating a curved plane passing through the detected portions, and
 a plane threshold-value reception portion for receiving the threshold-value data based on the height information corresponding to the portions through which the curved plane passes,
the setting step further comprising:
a first detection step for detecting, from the first image, a first partial image having only height information larger or smaller than height information of the curved plane specified by the threshold-value data, based on the height information about the object which has been inputted in the setting mode, and based on the threshold-value data received in the threshold-value reception step, wherein
the driving processing step comprises:
 a driving-image display step for receiving a second image acquired by photographing the object in the driving mode and displaying it, and
 a second detection step for detecting, from the second image, a second partial image having only height information larger or smaller than height information of the curved plane specified by the threshold-value data, based on the height information about the object which has been inputted in the driving mode, and based on the threshold-value data received in the threshold-value reception step in the setting mode.

* * * * *